United States Patent
Tsuda

(10) Patent No.: US 11,997,749 B2
(45) Date of Patent: May 28, 2024

(54) WIRELESS COMMUNICATION DEVICE AND COMMUNICATION CONTROL METHOD

(71) Applicant: Sony Group Corporation, Tokyo (JP)

(72) Inventor: Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 280 days.

(21) Appl. No.: 17/615,101

(22) PCT Filed: Jun. 5, 2020

(86) PCT No.: PCT/JP2020/022398
§ 371 (c)(1),
(2) Date: Nov. 30, 2021

(87) PCT Pub. No.: WO2020/250836
PCT Pub. Date: Dec. 17, 2020

(65) Prior Publication Data
US 2022/0232364 A1     Jul. 21, 2022

(30) Foreign Application Priority Data
Jun. 14, 2019   (JP) .............................. 2019-111603

(51) Int. Cl.
*H04W 8/04* (2009.01)
*H04W 60/00* (2009.01)
(Continued)

(52) U.S. Cl.
CPC ............. *H04W 8/04* (2013.01); *H04W 60/00* (2013.01); *H04W 84/042* (2013.01); *H04W 88/06* (2013.01)

(58) Field of Classification Search
CPC ... H04W 60/005; H04W 48/08; H04W 88/06; H04W 76/15
See application file for complete search history.

(56) References Cited

U.S. PATENT DOCUMENTS

2013/0303203 A1   11/2013   Wang et al.
2015/0065132 A1   3/2015   Ramkumar et al.
(Continued)

FOREIGN PATENT DOCUMENTS

CN    105915245 A    8/2016
EP     2424307 A1    2/2012
(Continued)

OTHER PUBLICATIONS

International Search Report and Written Opinion dated Sep. 8, 2020, received for PCT Application PCT/JP2020/022398, Filed on Jun. 5, 2020, 6 pages including English Translation.
(Continued)

*Primary Examiner* — Kevin Kim
(74) *Attorney, Agent, or Firm* — XSENSUS LLP

(57) ABSTRACT

A wireless communication device (100) according to the present disclosure includes a control unit (140). The control unit (140) acquires a first PLMN list (40) on the basis of information stored in a first subscriber identity module (30A), selects a home PLMN from the first PLMN list (40), acquires a second PLMN ID on the basis of information stored in a second subscriber identity module (30B), performs a first registration request to a first management device (10A) which belongs to the home PLMN and manages registration of the wireless communication device (100) in a case where the second PLMN ID is not included in the first PLMN list (40), and performs, to the first management device (10A), a second registration request with information regarding the second PLMN included therein in a case where the second PLMN ID is included in the first PLMN list (40).

10 Claims, 24 Drawing Sheets

(51) Int. Cl.
*H04W 88/06* (2009.01)
*H04W 84/04* (2009.01)

(56) References Cited

U.S. PATENT DOCUMENTS

| | | |
|---|---|---|
| 2015/0141012 A1 | 5/2015 | Ramkumar et al. |
| 2016/0249204 A1 | 8/2016 | Uhari et al. |
| 2017/0055201 A1* | 2/2017 | Murray ................ H04W 48/16 |
| 2017/0094589 A1* | 3/2017 | Bhasin ................ H04W 48/18 |
| 2019/0021064 A1 | 1/2019 | Ryu et al. |
| 2019/0159116 A1* | 5/2019 | Guan .................... H04W 60/00 |

FOREIGN PATENT DOCUMENTS

| | | | |
|---|---|---|---|
| WO | 2017/166278 A1 | 10/2017 | |
| WO | WO-2017185270 A1 * | 11/2017 | ............ H04W 48/16 |
| WO | 2018/008944 A1 | 1/2018 | |

OTHER PUBLICATIONS

Samsung, "FS_MUSIM 22834 P-CR: Definitions", 3GPP TSG-SA WG1 Meeting #86, S1-191029, May 6-10, 2019, 3 pages.
Office Action issued on Oct. 11, 2023, in corresponding Chinese patent Application No. 202080043098.2, 13 pages.
Extended European search report issued on Jun. 30, 2022, in corresponding European patent Application No. 20821873.5, 15 pages.
Intel, "PLMN selection and cell (re-)selection for dual-registration mode", 3GPP TSG-CT WG1 Meeting #109, C1-181605, 3GPP TS 24.501, v 0.3.1, Montreal (Canada), Feb. 26-Mar. 2, 2018, total 7 pages.

* cited by examiner

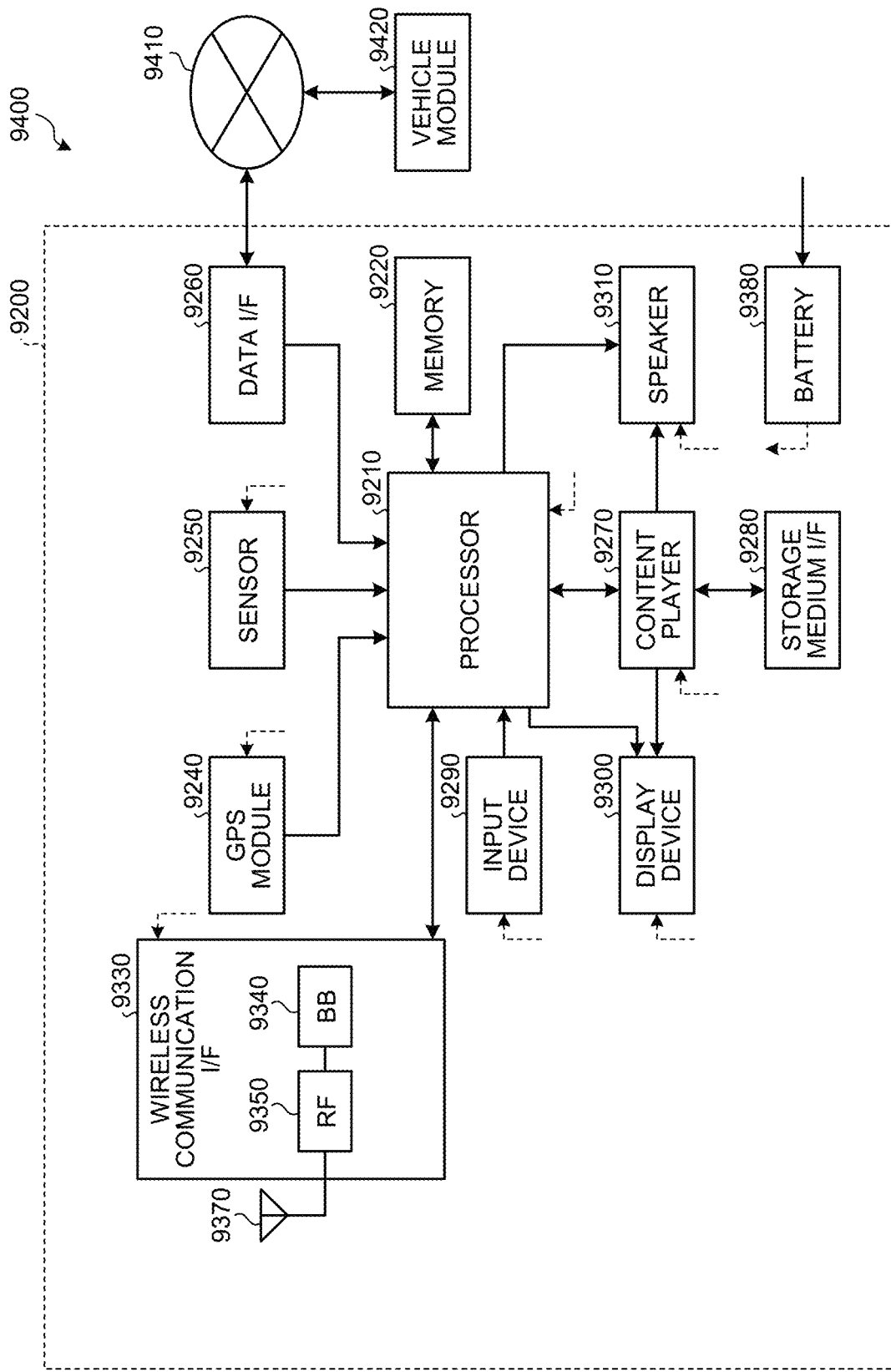

WIRELESS COMMUNICATION DEVICE AND COMMUNICATION CONTROL METHOD

CROSS-REFERENCE TO RELATED APPLICATIONS

The present application is based on PCT filing PCT/JP2020/022398, filed Jun. 5, 2020, which claims priority to JP 2019-111603, filed Jun. 14, 2019, the entire contents of each are incorporated herein by reference.

FIELD

The present disclosure relates to a wireless communication device and a communication control method.

BACKGROUND

In recent years, a technology has been proposed which connects one user equipment (UE) to networks of a plurality of communication carriers by mounting a plurality of subscriber identity modules (SIMs) in the UE. In such a technology, when the UE includes only one transmission/reception unit, the UE cannot be simultaneously connected to networks of different communication carriers. For example, even in a case where the UE is mounted with two SIMs and can be connected to two networks, when the UE includes only one transmission/reception unit, while being connected to one network, the UE cannot receive paging from another network.

In this regard, a technology has been proposed in which a UE is simultaneously connected to a plurality of networks by sharing information with the plurality of networks (see, for example, Patent Literature 1). In such a technology, when paging information from another network is provided to one network, the UE can receive paging from the another network which is not directly connected via the one network.

CITATION LIST

Patent Literature

Patent Literature 1: US 2013/0303203 A

SUMMARY

Technical Problem

However, in the above related art, it is disclosed that the networks share the paging information, but it cannot be said that a specific mechanism of how the UE is connected to a plurality of networks has been sufficiently studied.

In this regard, the present disclosure proposes a mechanism in which a UE mounted with a plurality of SIMs can be connected to a plurality of networks.

Solution to Problem

The wireless communication device according to the present disclosure includes a control unit. The control unit acquires a first PLMN list on the basis of information stored in a first subscriber identity module, selects a home PLMN from the first PLMN list, acquires a second PLMN ID on the basis of information stored in a second subscriber identity module, performs a first registration request to a first management device which belongs to the home PLMN and manages registration of the wireless communication device in a case where the second PLMN ID is not included in the first PLMN list, and performs, to the first management device, a second registration request with information regarding the second PLMN included therein in a case where the second PLMN ID is included in the first PLMN list.

BRIEF DESCRIPTION OF DRAWINGS

FIG. 30 is a block diagram illustrating an example of a schematic configuration of a car navigation device to which the technology according to the present disclosure can be applied.

DESCRIPTION OF EMBODIMENTS

Figure 1:
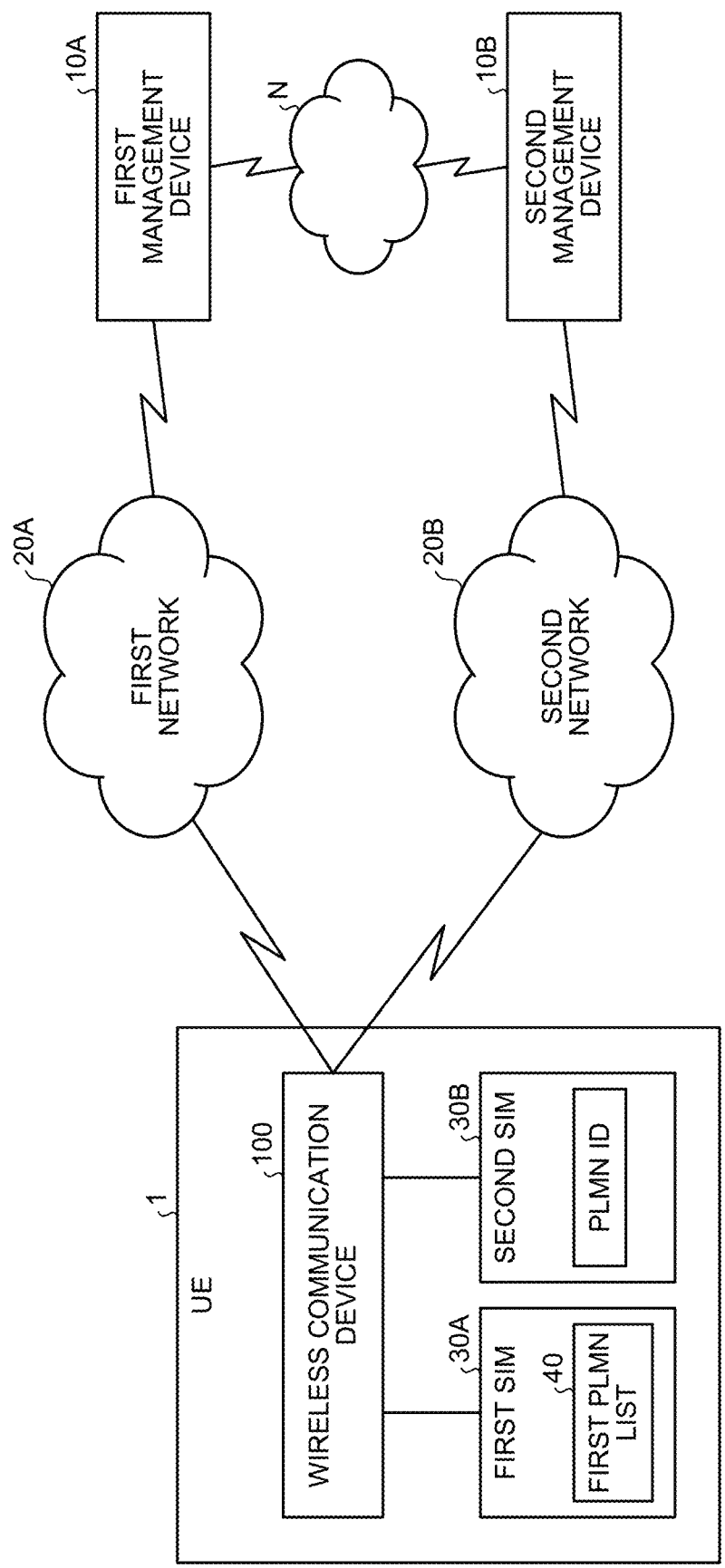
FIG. 1 is a diagram illustrating an example of a communication system according to an embodiment of the present disclosure.

Hereinafter, each of the embodiments of the present disclosure will be described in detail on the basis of the drawings. Incidentally, in each of the following embodiments, the same reference signs are given to the same portions, and duplicate description will be omitted.

Further, in this specification and the drawings, a plurality of components having substantially the same functional configuration may be distinguished by adding different alphabets after the same reference signs. However, in a case where it is not necessary to distinguish each of the plurality of components having substantially the same functional configuration, only the same reference signs are given.

The present disclosure will be described according to the order of items described below.

1. Introduction
2. Overview of communication system
2.1. Overview of system configuration
2.2. Overview of registration process
3. Configuration of communication system
3.1. Configuration example of network architecture
3.2. Configuration example of management device
3.3. Configuration example of wireless communication device
4. Operation of communication system
4.1. Registration activation process
   4.1.1. When power is turned on
   4.1.2. Switching instruction from upper layer
   4.1.3. Switching instruction from management device
4.2. Registration selection process
4.3. Details of registration selection process
4.4. Registration process
   4.4.1. First registration process
   4.4.2. Second registration process
   4.4.3. Third registration process
4.5. Selection process of switching instruction
5. Application example
5.1. Application example of radio access technology
   5.1.1. Application example to LTE
   5.1.2. Application example in case where LTE and NR are mixed
5.2. Application example regarding wireless communication device
5.3. Other application examples
6. Modification
7. Conclusion <1. Introduction>

A radio access technology such as long term evolution (LTE) and new radio (NR) is examined in 3rd generation partnership project (3GPP). LTE and NR are a type of cellular communication technology and enable mobile communication of terminal devices (UEs) by arranging a plurality of areas covered by base stations in a cell shape. Incidentally, in the following description, it is assumed that "LTE" includes LTE-advanced (LTE-A), LTE-advanced pro (LTE-A Pro), and evolved universal terrestrial radio access (EUTRA). Further, it is assumed that NR includes new radio access technology (NRAT) and further EUTRA (FEUTRA).

NR is a radio access technology (RAT) of a next generation (fifth generation) of LTE. NR is a radio access technology that can support various use cases including enhanced mobile broadband (eMBB), massive machine type communications (mMTC), and ultra-reliable and low latency communications (URLLC). NR is examined for a technical framework that addresses usage scenarios, requirements, and deployment scenarios in those use cases.

Further, in NR, an examination on a non-terrestrial network (NTN) has started due to an increase in demand for wide area coverage, connection stability, and the like. In the non-terrestrial network, a wireless network is scheduled to be provided to a terminal device via a base station other than a ground station such as a satellite station or an aircraft station. The base station other than the ground station is referred to as a non-ground station or a non-ground base station. A wireless network provided by a ground station is referred to as a terrestrial network (TN). By using the same wireless access system for the terrestrial network and the non-terrestrial network, integrated operation of the terrestrial network and the non-terrestrial network becomes possible.

Incidentally, in the embodiment of the present disclosure, a ground station (also referred to as a ground base station) refers to a base station (including a relay station) installed on the ground. The "ground" is a ground in a broad sense including not only the ground (land) but also underground, water, and underwater, and may be a concept including the inside or the outside of a building or a vehicle on the ground.

<2. Overview of Communication System>
<2.1. Overview of System Configuration>

An overview of a communication system according to an embodiment of the present disclosure will be described with reference to FIG. 1. FIG. 1 is a diagram illustrating an example of the communication system according to the embodiment of the present disclosure. As illustrated in FIG. 1, the communication system includes a UE 1, first and second subscriber identity modules (hereinafter, also referred to as first and second SIMs 30A and 30B) mounted in the UE 1, first and second networks 20A and 20B, and first and second management devices 10A and 10B.

Incidentally, hereinafter, in order to simplify the description, a case where two SIMs 30 are mounted in the UE 1 (dual SIM) will be described as an example. However, a plurality of SIMs 30 may be mounted in the UE 1, and three or more SIMs 30 may be mounted.

The first and second management devices 10A and 10B are network devices which manage a plurality of UEs 1. For example, the first and second management devices 10A and 10B are a device which functions as a mobility management entity (MME) in LTE or an access and mobility management function (AMF) in NR. In this embodiment, it is assumed that the first and second management devices 10A and 10B are operated by different first and second mobile network operators (MNO), respectively, but the present invention is not limited thereto. The first MNO and the second MNO may be the same MNO. Incidentally, it is assumed that the first and second management devices 10A and 10B communicate with each other via a network N different from the first and second networks 20A and 20B, for example.

The first network 20A is a network operated by the first MNO, and the first management device 10A communicates with the UE 1 via the first network 20A. The second network 20B is a network operated by the second MNO, and the second management device 10B communicates with the UE 1 via the second network 20B.

The first and second networks 20A and 20B are, for example, an evolved packet system (EPSS) in LTE and are a 5G System (5GS)/next generation system (NGS) in NR.

The first and second MNOs may operate respective networks by using different radio access technologies, or may operate respective networks by using the same radio access technology. For example, the first MNO may provide a wireless service to the UE 1 according to an LTE wireless communication system, and the second MNO may provide a wireless service according to an NR wireless communication system. As described above, the first and second MNOs may not necessarily adopt the same wireless communication system. Alternatively, the first MNO and the second MNO may provide wireless services according to the same NR wireless communication system.

The first SIM 30A stores information for the user using the UE 1 to use the service provided by the first MNO. The first SIM 30A stores, for example, a list (first PLMN list 40) of public land mobile networks (PLMN) to which the UE 1 can be connected.

The first PLMN list 40 includes, for example, IDs (PLMN IDs) for identifying a plurality of connectable PLMNs. For example, the first PLMN list 40 includes, in addition to a first PLMN ID held by the first MNO, a PLMN ID held by an MNO with which the first MNO has a roaming agreement.

The second SIM 30B stores information for the user using the UE 1 to use the service provided by the second MNO. The second SIM 30B stores, for example, an ID (PLMN ID) for identifying a PLMN to which the UE 1 can be connected. Incidentally, although FIG. 1 illustrates an example in which the second SIM 30B stores one PLMN ID, the second SIM 30B may store a plurality of PLMN IDs. In this case, for example, it is assumed that the second SIM 30B stores the second PLMN list similarly to the first SIM 30A.

The UE 1 is mounted with the first and second SIMs 30A and 30B. Further, the UE 1 includes a wireless communication device 100. The wireless communication device 100 is alternatively connected to one of the first network 20A and the second network 20B on the basis of the information stored in the first and second SIMs 30A and 30B, and performs communication.

As described above, the UE 1 is mounted with the two SIMs 30. However, the UE 1 cannot be connected to the first and second networks 20A and 20B at the same time and communicates with one of the first and second networks 20A and 20B. In other words, the UE 1 performs communication with the first and second networks 20A and 20B in a time-division manner.

<2.2. Overview of Registration Process>

Figure 2:
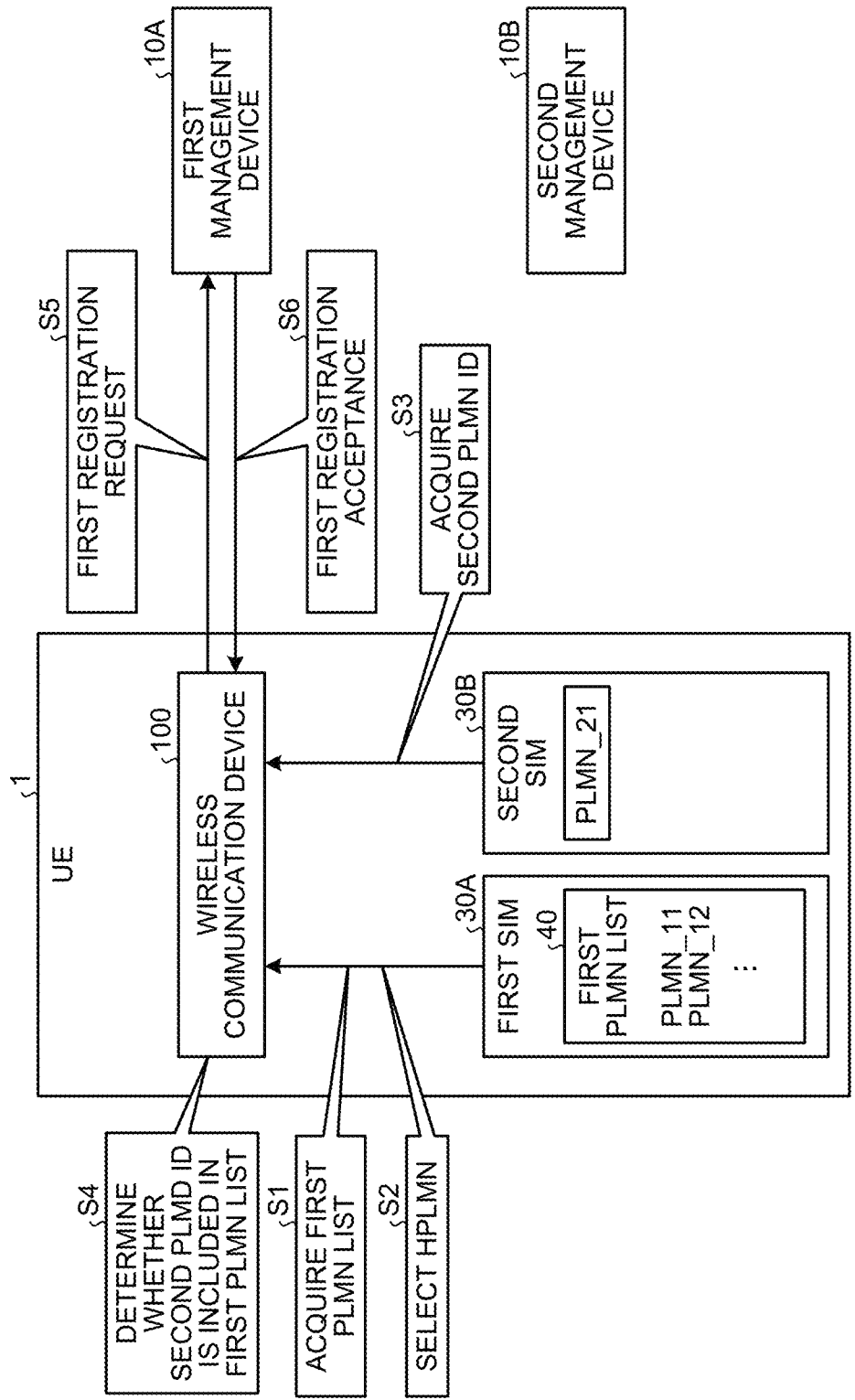
FIG. 2 is a diagram (1) illustrating an example of a registration process according to the embodiment of the present disclosure.
Figure 3:
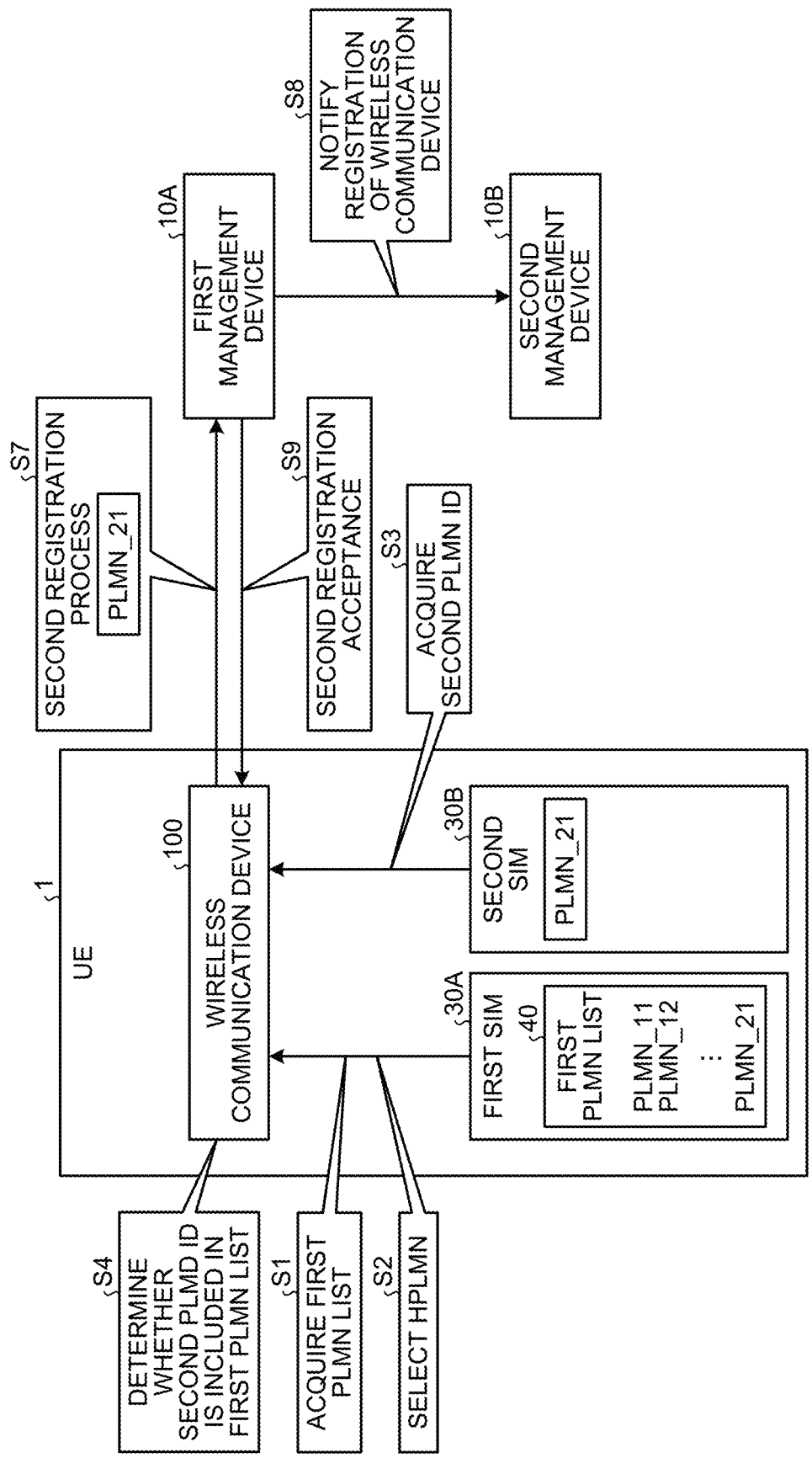
FIG. 3 is a diagram (2) illustrating an example of a registration process according to the embodiment of the present disclosure.

Next, an overview of a registration process according to the embodiment of the present disclosure will be described with reference to FIGS. 2 and 3. FIG. 2 is a diagram (1) illustrating an example of the registration process according to the embodiment of the present disclosure. FIG. 3 is a diagram (2) illustrating an example of the registration process according to the embodiment of the present disclosure.

The registration process according to the embodiment of the present disclosure is realized by the wireless communication device 100 of the UE 1. Incidentally, here, in addition to the registration process by the wireless communication device 100, a process of the first management device 10A which receives the registration request by the wireless communication device 100 will also be briefly described.

Further, here, it is assumed that the wireless communication device 100 performs a registration request to the first management device 10A for connection to the first network 20A, and receives the service provided by the first MNO.

Whether or not the UE 1 can receive the service provided by the second MNO via the first network 20A differs depending on whether or not the first and second MNOs have a roaming agreement, for example. In this regard, first, for example, a case where the first and second MNOs do not have a roaming agreement, and the wireless communication device 100 cannot receive the service provided by the second MNO via the first network 20A will be described with reference to FIG. 2. Subsequently, for example, a case where the first and second MNOs have a roaming agreement, and the wireless communication device 100 can receive the service provided by the second MNO via the first network 20A will be described with reference to FIG. 3.

As illustrated in FIG. 2, the wireless communication device 100 acquires the first PLMN list 40 from the first SIM 30A (step S1). The first PLMN list 40 includes, in addition to the first PLMN ID of the first MNO, a PLMN ID of an MNO which has a roaming agreement with the first MNO. As described above, the first PLMN list 40 includes a plurality of PLMN IDs.

The wireless communication device 100 selects an HPLMN (home PLMN) from the first PLMN list 40 (step S2). The wireless communication device 100 selects a PLMN ID which is available and has a higher priority as the HPLMN from a plurality of PLMN IDs included in the first PLMN list 40.

Subsequently, the wireless communication device 100 acquires a second PLMN ID from the second SIM 30B (step S3). In the example of FIG. 2, the wireless communication device 100 acquires "PLMN_21" as the second PLMN ID. Incidentally, here, the wireless communication device 100 acquires the second PLMN ID, but the present invention is not limited thereto. For example, the wireless communication device 100 may acquire the second PLMN list from the second SIM 30B. Here, the second PLMN list may include a plurality of PLMN IDs in addition to the second PLMN ID, for example.

The wireless communication device 100 determines whether or not the second PLMN ID acquired from the second SIM 30B is included in the first PLMN list 40 (step S4). In the example illustrated in FIG. 2, the first and second MNOs do not have a roaming agreement and do not receive the service of the second MNO via the first network 20A, and thus the first PLMN list 40 does not include the second PLMN ID (PLMN_21).

In this case, the wireless communication device 100 performs (transmits) a first registration request to the first management device 10A belonging to the HPLMN (step S5). The first registration request herein is an Attach request in LTE and a Registration request in NR.

When receiving the first registration request from the wireless communication device 100 and permitting the registration, the first management device 10A transmits first registration acceptance (Accept) to the wireless communication device 100 (step S6).

Accordingly, the wireless communication device 100 is connected to the first network 20A and enters the communication range (registered state) with respect to the communication performed via the first network 20A. On the other hand, the wireless communication device 100 is not connected to the second network 20B, and is out of the communication range for the communication performed via the second network 20B (deregistered state).

Subsequently, a case where the first and second MNOs have a roaming agreement will be described with reference to FIG. 3. Incidentally, the processing up to step S4 is the same as that in FIG. 2, and thus the description thereof will be omitted.

In a case where the first and second MNOs have a roaming agreement, the first PLMN list 40 includes the second PLMN ID (PLMN_21) as illustrated in FIG. 3. In this case, the wireless communication device 100 performs a second registration request to the first management device 10A belonging to the HPLMN (step S7). Specifically, the wireless communication device 100 performs (transmits), to the first management device 10A, the second registration request with information (for example, "PLMN_21" which is the second PLMN ID) regarding the second PLMN included therein.

Upon receiving the second registration request, the first management device 10A registers the wireless communication device 100. Further, the first management device 10A notifies the second management device 10B belonging to the second PLMN included in the second registration request of the registration of the wireless communication device 100 (step S8).

Accordingly, the first management device 10A can communicate with the UE 1, and the second management device 10B can communicate with the UE 1 via the first network 20A, for example.

The first management device 10A transmits second registration acceptance (Accept) of permitting registration to the UE 1 (step S9).

Accordingly, the wireless communication device 100 is connected to the first network 20A and enters the communication range with respect to communication performed via the first network 20A. Further, the wireless communication device 100 is connected to the second network 20B via the first network 20A, and also enters the communication range with respect to the second network 20B.

Incidentally, in the following embodiment, in order to simplify the description, a case will be described in which an NR technology is used as a radio access technology. A case where LTE is used and a case where LTE and NR are mixed will be collectively described as an application example in FIG. 20 and subsequent drawings.

<3. Configuration of Communication System>
<3.1. Configuration Example of Network Architecture>

Figure 4:
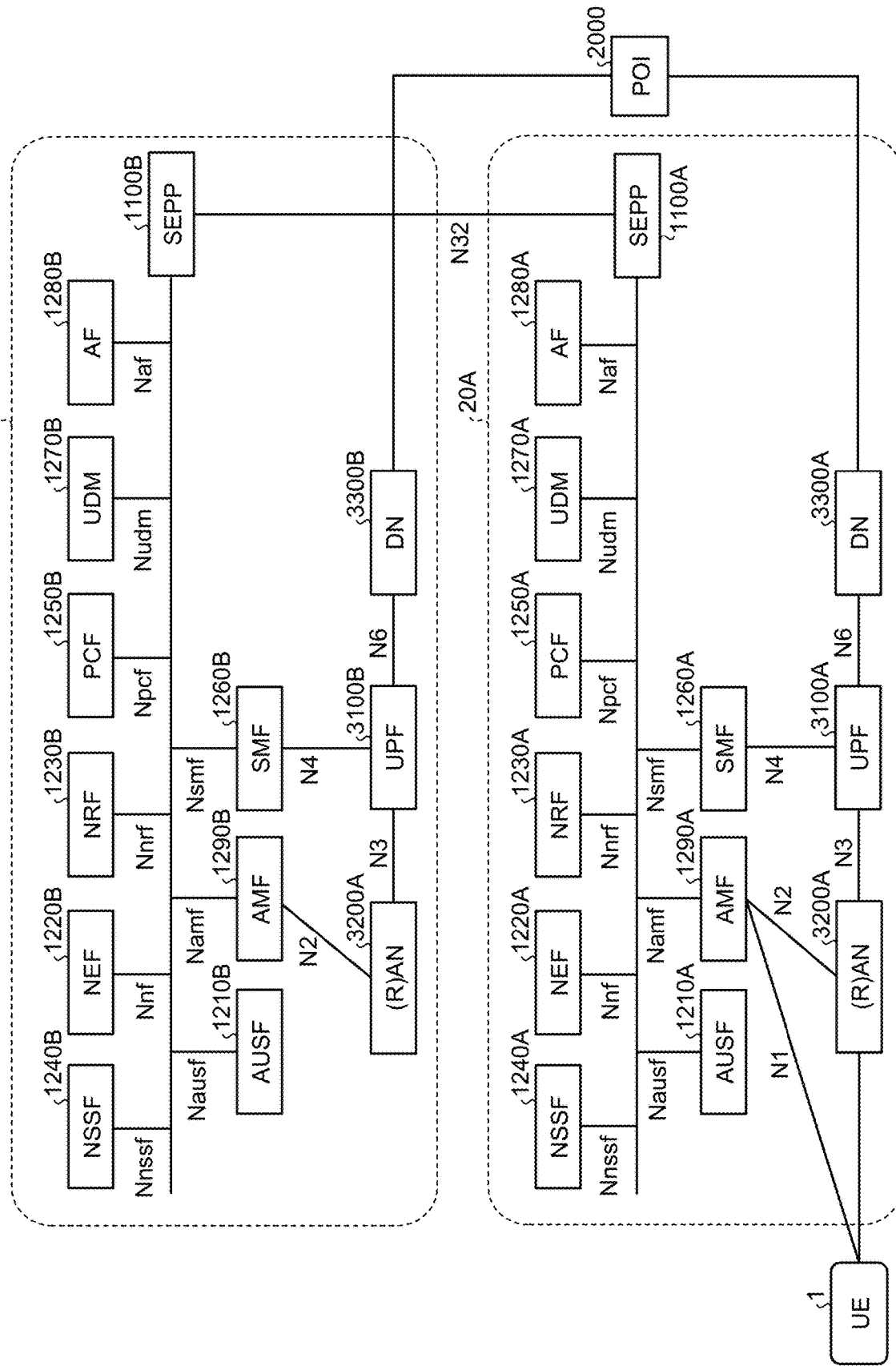
FIG. 4 is a diagram illustrating an example of a network architecture configuration according to the embodiment of the present disclosure.

Next, an overview of a configuration of a network architecture of NR will be described with reference to FIG. 4. FIG. 4 is a diagram illustrating an example of the network architecture configuration according to the embodiment of the present disclosure.

The network architecture illustrated in FIG. 4 includes the UE 1 and the first and second networks 20A and 20B. In FIG. 4, the UE 1 is connected to the first network 20A, but the UE 1 is also connectable to the second network 20B.

The control planes of the first and second networks 20A and 20B are connected at a reference point N32 via security edge protection proxies (SEPPs) 1100A and 1100B. Further, a user plane is connected via a point of interface (POI) 2000.

The function group of the control planes includes an authentication server function (AUSF) 1210, a network exposure function (NEF) 1220, a network repository function (NRF) 1230, a network slice selection function (NSSF) 1240, a policy control function (PCF) 1250, a session management function (SMF) 1260, a unified data management (UDM) 1270, an application function (AF) 1280, and an AMF 1290. The UDM 1270 includes a unified data repository (UDR) which holds and manages subscriber information and a front end (FE) unit which processes the subscriber information. Further, the AMF 1290 performs mobility management, and the SMF 1260 performs session management. A device which realizes the function of the AMF 1290 is the management device 10 in FIG. 1.

A user plane function (UPF) 3100 has a function of user plane processing. The management device 10 may have a function as the UPF 3100. A (R)AN 3200 has a function of enabling connection to a radio access network (RAN) and connection to an access network (AN) other than the RAN. The (R)AN 3200 includes a base station device called a gNB or an ng-eNB. A data network (DN) 3300 has a function of enabling connection to MNO-specific services, the Internet, and third-party services.

<3.2. Configuration Example of Management Device>

Figure 5:
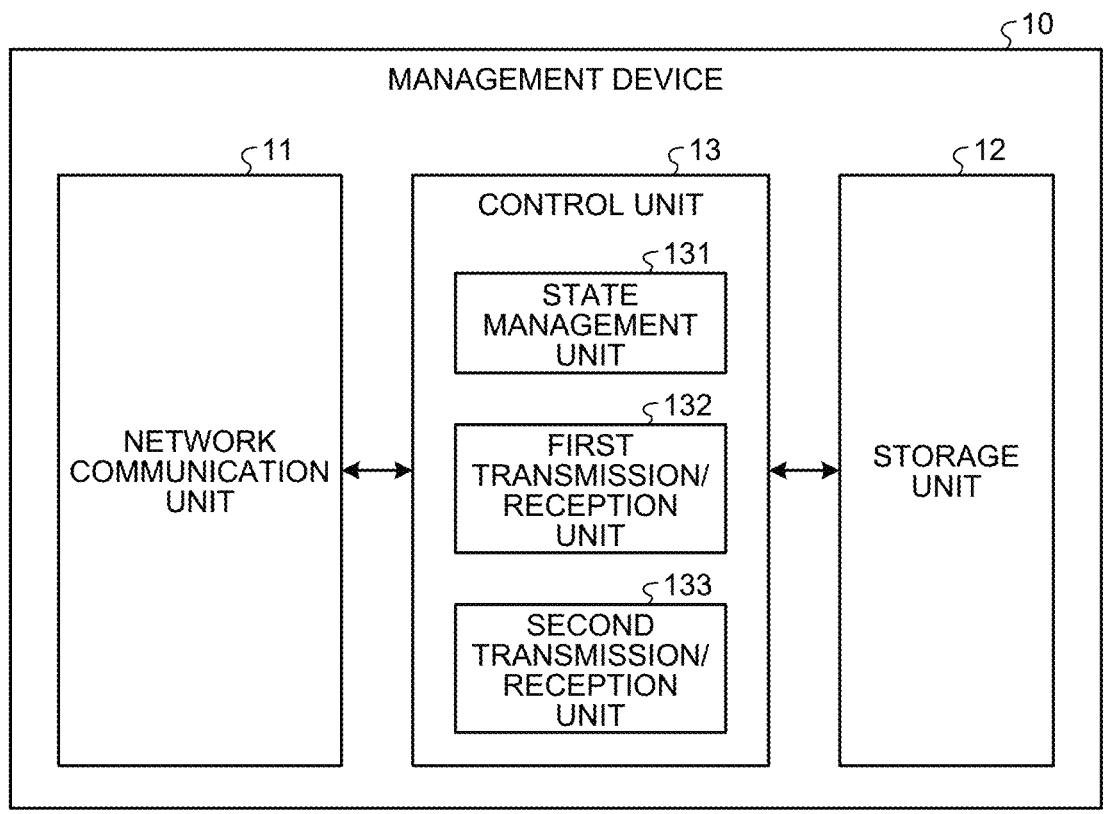
FIG. 5 is a diagram illustrating a configuration example of a management device according to the embodiment of the present disclosure.

Subsequently, a configuration of the management device 10 according to the embodiment of the present disclosure will be described with reference to FIG. 5. FIG. 5 is a diagram illustrating a configuration example of the management device 10 according to the embodiment of the present disclosure.

The management device 10 includes a network communication unit 11, a storage unit 12, and a control unit 13, and realizes the function of the AMF 1290 (see FIG. 4). Incidentally, the configuration illustrated in FIG. 5 is a functional configuration, and the hardware configuration may be different therefrom. Further, the functions of the management device 10 may be distributed and implemented in a plurality of physically separated configurations. For example, the management device 10 may be configured by a plurality of server devices.

The network communication unit 11 is a communication interface for communication with other devices. The network communication unit 11 may be a network interface or a device connection interface. The network communication unit 11 has a function of directly or indirectly connecting to a core network. For example, the network communication unit 11 may include a local area network (LAN) interface such as a network interface card (NIC), or may include a universal serial bus (USB) interface configured by a USB host controller, a USB port, and the like. Further, the network communication unit 11 may be a wired interface or a wireless interface. The network communication unit 11 functions as a communication means of the management device 10. The network communication unit 11 communicates with the UE 1, another management device, or a communication function network function (NF) according to the control of the control unit 13. In a 5G architecture, a service-based architecture is adopted, and the NFs are connected via a uniform interface called a service-based interface.

The storage unit 12 is a storage device, such as a dynamic random access memory (DRAM), a static random access memory (SRAM), a flash memory, and a hard disk, which can read and write data. The storage unit 12 functions as a storage means of the management device 10. The storage unit 12 stores, for example, a state of registration management (RM) of the UE 1. The storage unit 12 may function as a home memory which stores the position information of the UE 1.

The control unit 13 is a controller which controls each unit of the management device 10. For example, the control unit 13 is realized by a processor such as a central processing unit (CPU) or a micro processing unit (MPU). For example, the control unit 13 is realized when the processor executes various programs stored in the storage device inside the management device 10 by using random access memory (RAM) or the like as a work area. Incidentally, the control unit 13 may be realized by an integrated circuit such as an application specific integrated circuit (ASIC) and a field programmable gate array (FPGA). Any one of the CPU, MPU, ASIC, and FPGA can be regarded as a controller.

As illustrated in FIG. 5, the control unit 13 includes a state management unit 131, a first transmission/reception unit 132, and a second transmission/reception unit 133, and realizes or executes a function and an action of communication processing such as a selection process of a switching instruction described below. Incidentally, the internal structure of the control unit 13 is not limited to the configuration illustrated in FIG. 5, and may be another configuration as long as communication processing to be described later is performed. Further, the connection relationship among the processing units included in the control unit 13 is not limited to the connection relationship illustrated in FIG. 5, and may be another connection relationship.

Figure 6:
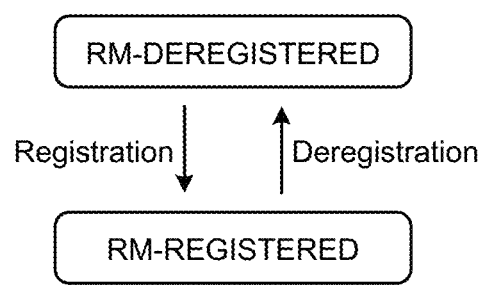
FIG. 6 is a state transition diagram illustrating a registration state of a UE.

The state management unit 131 manages the state transition of the RM of the UE 1. Here, the state transition of the RM of the UE 1 will be described with reference to FIG. 6. FIG. 6 is a state transition diagram illustrating the registration state of the UE 1.

In FIG. 6, RM-REGISTERED indicates a state in which the UE 1 (or the wireless communication device 100) is registered, and RM-DEREGISTERED indicates a state in which the UE 1 is not registered (non-registration). That is, the state transition of the RM of the UE 1 depends on whether the UE 1 is registered in 5G core (5 GC)/next generation core (NGC).

When the power of the UE 1 is turned on and registered in the management device 10, the state management unit 131 transitions the state of the UE 1 from RM-DEREGISTERED to RM-REGISTERED.

When the power of the UE 1 is turned off, or the UE 1 is out of the range, the management device 10 deletes the registration of the UE 1, and the state management unit 131 transitions the state of the UE 1 from RM-REGISTERED to RM-DEREGISTERED.

Alternatively, in a case where the management device 10 receives the Registration request from the UE 1 (or a case where the management device 10 transmits a Registration Accept to the UE 1), the state management unit 131 transitions the state of the UE 1 from RM-DEREGISTERED to RM-REGISTERED. Further, in a case where the management device 10 receives a Deregistration request from the UE 1 (or a case where the management device 10 transmits a Deregistration Accept to the UE 1), the state management unit 131 transitions the state of the UE 1 from RM-REGISTERED to RM-DEREGISTERED.

Incidentally, for example, the state management unit 131 may manage the first PLMN ID stored in the first SIM 30A as a home PLMN, and manage the second PLMN ID stored in the second SIM 30B as a visitor PLMN.

The first transmission/reception unit 132 transmits and receives signals to and from another management device 10. In a case where the second PLMN is included in the second registration request, the first transmission/reception unit 132 notifies the second management device 10B belonging to the second PLMN of the registration of the UE 1. Further, in a case where the second PLMN is managed as the visitor PLMN, the first transmission/reception unit 132 receives the notification regarding paging from the second management device 10B to the UE 1. Such notification may include, for example, information regarding the size (hereinafter, also referred to as a paging size) of data to be transmitted by such paging.

The second transmission/reception unit 133 transmits and receives signals to and from the UE 1. The second transmission/reception unit 133 receives a Registration request and a Deregistration request from the UE 1. Further, in the case of accepting the Registration request, the first transmission/reception unit 132 transmits a Registration accept to the UE 1.

The second transmission/reception unit 133 transmits, to the UE 1, a switching instruction for switching the PLMN to be connected, for example. For example, in a case where the first transmission/reception unit 132 receives the notification regarding paging from the second management device 10B to the UE 1, the second transmission/reception unit 133 transmits the switching instruction.

At this time, the second transmission/reception unit 133 transmits the switching instruction according to the size of paging to the UE 1. For example, in a case where the paging size is larger than a predetermined threshold, the second transmission/reception unit 133 transmits, to the UE 1, a switching instruction (hereinafter, also referred to as a complete switching instruction) for completely switching the network 20 (the connection destination of the UE 1). On the other hand, in a case where the paging size is equal to or smaller than the predetermined threshold, the second transmission/reception unit 133 transmits, to the UE 1, a switching instruction (hereinafter, also referred to as a temporary switching instruction) for temporarily switching the network 20 (the connection destination of the UE 1) during a first timer period T1. The temporary switching instruction includes information (for example, a value of the first timer period T1) regarding the first timer period T1.

<3.3. Configuration Example of Wireless Communication Device>

Figure 7:
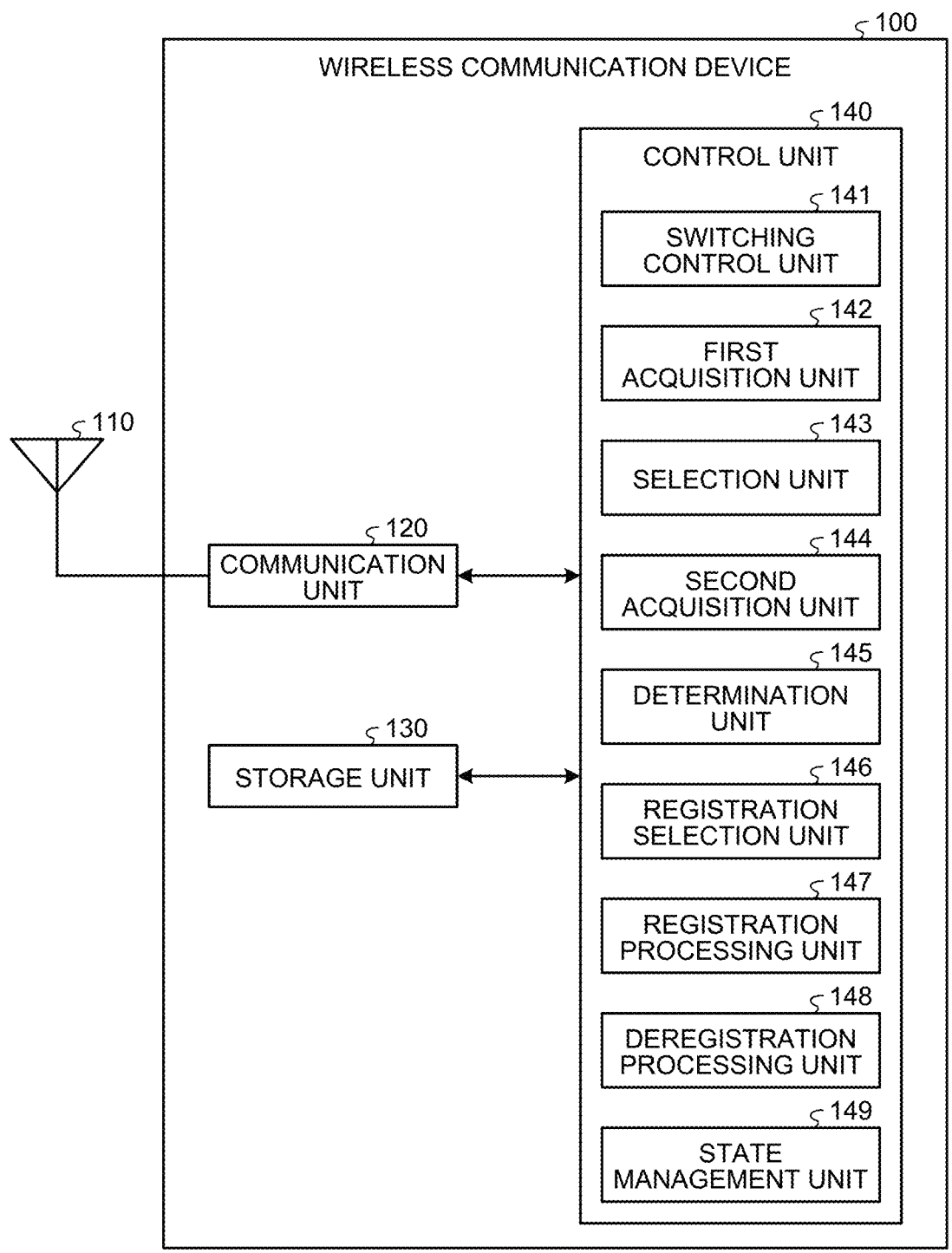
FIG. 7 is a diagram illustrating a configuration example of a wireless communication device according to the embodiment of the present disclosure.

FIG. 7 is a diagram illustrating a configuration example of the wireless communication device 100 according to the embodiment of the present disclosure. As illustrated in FIG. 7, the wireless communication device 100 includes an antenna unit 110, a communication unit 120, a storage unit 130, and a control unit 140.

The antenna unit 110 radiates a signal output by the communication unit 120 as a radio wave into space. Further, the antenna unit 110 converts the radio wave in space into a signal, and outputs the signal to the communication unit 120.

The communication unit 120 wirelessly transmits and receives the signal. For example, the communication unit 120 receives a downlink signal from the management device 10 and transmits an uplink signal to the management device 10.

The storage unit 130 is a storage device, such as a dynamic random access memory (DRAM), a static random access memory (SRAM), a flash memory, and a hard disk, which can read and write data. The storage unit 130 functions as a storage means of the wireless communication device 100. The storage unit 130 temporarily or permanently stores various programs and various data for the operation of the wireless communication device 100.

The control unit 140 is a controller which controls each unit of the wireless communication device 100. For example, the control unit 140 is realized by a processor such as a central processing unit (CPU) or a micro processing unit (MPU). For example, the control unit 140 is realized when the processor executes various programs stored in the storage device inside the wireless communication device 100 by using random access memory (RAM) or the like as a work area. Incidentally, the control unit 140 may be realized by an integrated circuit such as an application specific integrated circuit (ASIC) and a field programmable gate array (FPGA). Any one of the CPU, MPU, ASIC, and FPGA can be regarded as a controller.

As illustrated in FIG. 7, the control unit 140 includes a switching control unit 141, a first acquisition unit 142, a selection unit 143, a second acquisition unit 144, a determination unit 145, a registration selection unit 146, a registration processing unit 147, a deregistration processing unit 148, and a state management unit 149. Each unit of the control unit 140 realizes or executes a function and an action of communication processing such as a registration process described below. Incidentally, the internal structure of the control unit 140 is not limited to the configuration illustrated in FIG. 7, and may have another configuration as long as the communication processing to be described later is performed. Further, the connection relationship among the processing units included in the control unit 140 is not limited to the connection relationship illustrated in FIG. 7, and may be another connection relationship.

The switching control unit 141 controls switching of the connection destination network 20 (the connection destination of the UE 1) in accordance with an instruction from the management device 10 or an upper layer such as an application layer. The switching control unit 141 controls switching of the connection destination, for example, in a case where the power of the UE 1 or the wireless communication device 100 is turned on or a case where a switching instruction is received from the management device 10. Alternatively, the switching control unit 141 controls the switching of the connection destination, for example, in a case where a switching instruction is received from the upper layer with the activation of a predetermined application by a user operation as a trigger.

For example, when the power of the UE 1 or the wireless communication device 100 is turned on, the switching control unit 141 controls the switching of the network 20 so as to maintain the previous connection destination. That is, the switching control unit 141 determines the connection to the network 20 selected when the power is turned off.

On the other hand, in a case where there is an instruction from the management device 10 or the upper layer, the switching control unit 141 switches the connection destination network 20 from the currently connected network to the unconnected network on the basis of the switching instruction.

At this time, in a case where the switching instruction is a temporary switching instruction including the first timer period T1, the switching control unit 141 performs control to temporarily switch the connection destination to the first network 20A during a second timer period T2 according to the first timer period T1.

Incidentally, a process of selecting a connection destination network by the switching control unit 141 will be described later with reference to FIGS. 9 to 12. Further, hereinafter, in order to simplify the description, it is assumed that the switching control unit 141 selects the first network 20A as the connection destination.

According to the switching control of the network 20 (the connection destination of the UE 1) by the switching control unit 141, the first acquisition unit 142 acquires the first PLMN list 40 from the first SIM 30A corresponding to the first network 20A to be connected.

The selection unit 143 selects the available PLMN with a higher priority as the HPLMN from the first PLMN list 40 acquired by the first acquisition unit 142.

Subsequently, the second acquisition unit 144 acquires the second PLMN ID from the second SIM 30B corresponding to the second network 20B. Incidentally, the second acquisition unit 144 may acquire the second PLMN list including a plurality of second PLMN IDs.

The determination unit 145 determines whether or not the second PLMN ID acquired by the second acquisition unit 144 is included in the first PLMN list 40 acquired by the first acquisition unit 142. In a case where the second acquisition unit 144 acquires a plurality of second PLMN IDs, the determination unit 145 determines whether or not all the second PLMN IDs are included in the first PLMN list 40, for example, according to the priority of the second PLMN list.

The registration selection unit 146 selects the registration process to be performed by the registration processing unit 147 on the basis of the determination result. In a case where all the second PLMN IDs are not included in the first PLMN list 40, the registration selection unit 146 selects a first registration process. On the other hand, in a case where the second PLMN ID is included in the first PLMN list 40, the registration selection unit 146 selects a second registration process.

In a case where the switching control unit 141 selects the first network 20A of the connection destination to be switched on the basis of the temporary switching instruction from the management device 10, the registration selection unit 146 selects a third registration process.

The registration processing unit 147 executes the registration process according to the selection of the registration selection unit 146.

In a case where the registration selection unit 146 selects the first registration process, the registration processing unit 147 transmits a Registration request to the first management device 10A belonging to the first network 20A.

The first registration process is executed, for example, in a case where the wireless communication device 100 is not registered in the management device 10. Alternatively, for example, in a case where the wireless communication device 100 is registered in the second management device 10B, the first registration process is executed in a case where the registration destination of the wireless communication device 100 is switched from the second management device 10B to the first management device 10A.

In a case where the registration selection unit 146 selects the second registration process, the registration processing unit 147 transmits a second Registration request including information regarding the second PLMN, such as the second PLMN ID, to the first management device 10A.

The second registration process is a process for requesting the first management device 10A to manage the first PLMN as a home PLMN and, for example, manage the second PLMN as a visitor PLMN.

The second registration process is executed, for example, in a case where the wireless communication device 100 is not registered in the management device 10. Alternatively, for example, in a case where the wireless communication device 100 is registered in the second management device 10B, the second registration process is executed in a case where the registration destination of the wireless communication device 100 is switched from the second management device 10B to the first management device 10A.

In a case where the registration selection unit 146 selects the third registration process, the registration processing unit 147 performs the third registration process.

The third registration process is executed, for example, in a case where a temporary switching instruction is received from the second management device 10B. The third registration process is performed, for example, in a case where the first PLMN is managed as the visitor PLMN by the second management device 10B, and paging from the first network 20A occurs. In this case, the second management device 10B transmits a temporary switching instruction including information regarding the first timer period T1.

Upon receiving the temporary switching instruction, the switching control unit 141 performs control to temporarily switch the connection destination from the second network 20B to the first network 20A during the second timer period T2 according to the first timer period T1. In this regard, as the third registration process, the registration processing unit 147 requests the first management device 10A to perform registration during the second timer period T2. Specifically, the registration processing unit 147 transmits a third Registration request including information regarding the second timer period T2 to the first management device 10A.

For example, in a case where the connection destination network 20 is switched on the basis of a switching instruction from the upper layer or the network 20, the deregistration processing unit 148 executes a registration deletion (deregistration) request process on the second network 20B connected before switching.

Figure 8:
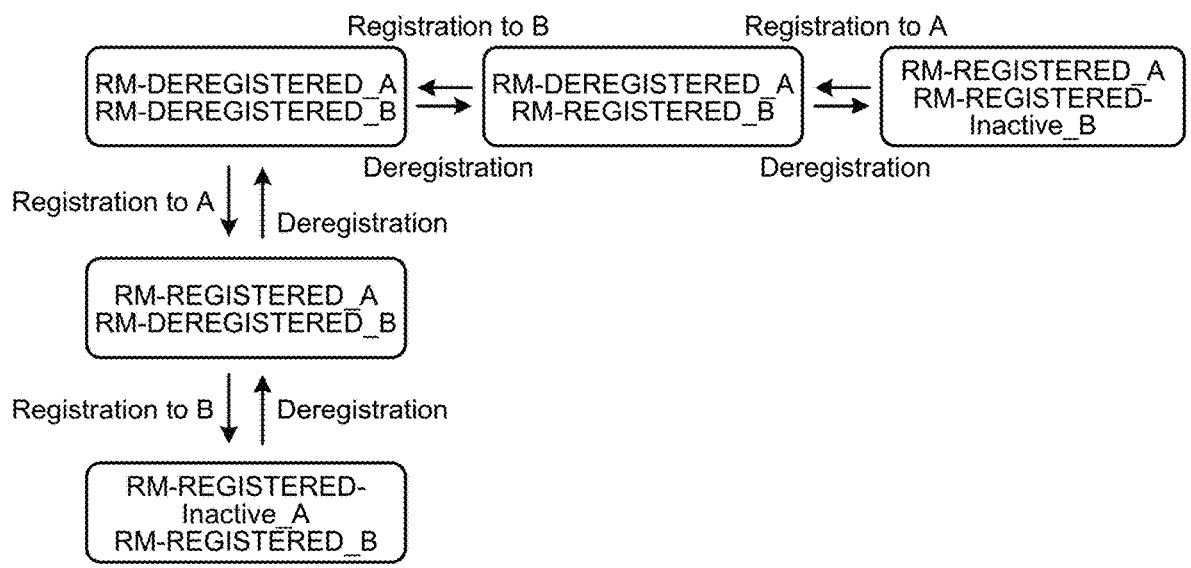
FIG. 8 is a diagram for explaining an example of a state transition of the UE.

The state management unit 149 manages the state transition of the RM of the UE 1. Here, the state transition of the RM of the UE 1 will be described with reference to FIG. 8. FIG. 8 is a diagram for explaining an example of the state transition of the UE 1. For each PLMN to be connected, the state management unit 149 manages, as the state of the UE 1, the registration state (RM-REGISTERED) registered in the management device 10 and the non-registration state (RM-DEREGISTERED) not registered.

In a case where the UE 1 (or the wireless communication device 100) is not registered in either of the first and second management devices 10A and 10B, for example, when the power is turned on, the state management unit 149 manages both the first PLMN and the second PLMN as the non-registration state (RM-DEREGISTERED_A, RM-DEREGISTERED_B).

Here, it is assumed that the registration processing unit 147 performs the first or second registration process on the first management device 10A. In this case, the state management unit 149 manages the first PLMN as the registration state (RM-REGISTERED_A) and the second PLMN as the non-registration state (RM-DEREGISTERED_B).

On the other hand, in a case where the deregistration processing unit 148 requests the first management device 10A to delete the registration of the UE 1 in the "RM-REGISTERED_A, RM-DEREGISTERED_B" state, the state management unit 149 manages both the first and second PLMNs as the non-registration state (RM-DEREGISTERED_A, RM-DEREGISTERED_B).

It is assumed that the switching control unit 141 selects to perform the registration process on the second management device 10B with both the first and second PLMNs in the non-registration state (RM-DEREGISTERED_A, RM-DEREGISTERED_B). In this case, the state management unit 149 causes the first PLMN to transition to the non-registration state (RM-DEREGISTERED_A) and the second PLMN to transition to the registration state (RM-REGISTERED_B).

It is assumed that the registration deletion of UE 1 is requested to the second management device 10B in the "RM-DEREGISTERED_A, RM-REGISTERED_B" state. In this case, the state management unit 149 causes both the first and second PLMNs to transition to the non-registration state (RM-DEREGISTERED_A, RM-DEREGISTERED_B).

Here, a state transition in a case where the registration processing unit 147 performs the third registration process will be described. The third registration process is executed in a case where the first PLMN is in the registration state (RM-REGISTERED_A), and the second PLMN is in the non-registration state (RM-DEREGISTERED_B). Alternatively, the third registration process is executed in a case where the first PLMN is in the non-registration state (RM-DEREGISTERED_A) and the second PLMN is in the registration state (RM-REGISTERED_B).

For example, it is assumed that the third registration process is executed with the first PLMN in the non-registration state (RM-DEREGISTERED_A) and the second PLMN in the registration state (RM-REGISTERED_B). In this case, the state management unit 149 causes the first PLMN to transition to the registration state (RM-REGISTERED_A) and the second PLMN to transition to a deemed non-registration state (RM-REGISTERED-Inactive_B) during the second timer period T2. Here, the deemed non-registration state is a state where management is performed as the state of not being registered in the second management device 10B although a registration deletion request is not made to the second management device 10B (for example, an inactive state). Therefore, during the deemed non-registration state, the UE 1 does not receive a signal from the second network 20B and does not transmit a signal via the second network 20B. However, at least a part of the context related to the UE 1 during the deemed non-registration state may be continuously held by the second management device 10B and the UE 1.

When the second timer period T2 elapses, the deregistration processing unit 148 executes the deregistration process on the first management device 10A, and the state management unit 149 causes the first PLMN to transition to the non-registration state (RM-DEREGISTERED_A) and the second PLMN to transition to the registration state (RM-REGISTERED_B). That is, in response to the expiration of the second timer period T2, the UE 1 transitions the second PLMN from the deemed non-registration state (RM-REGISTERED-Inactive_B) to the registration state (RM-REGISTERED_B) without performing the reregistration process to the second network 20B. At this time, at least a part of the context related to the UE 1 continuously held by the second management device 10B and the UE 1 may be reused.

Incidentally, in a case where the third registration process is executed with the second PLMN in the non-registration state (RM-DEREGISTERED_A) and the first PLMN in the registration state (RM-REGISTERED_B), the state management unit 149 causes the first PLMN to transition to the deemed non-registration state (RM-REGISTERED-Inactive_A) and the second PLMN to transition to the registration state (RM-REGISTERED_B). Further, when the second timer period T2 elapses, the state management unit 149 causes the first PLMN to transition to the registration state (RM-REGISTERED_A) and the second PLMN to transition to the non-registration state (RM-DEREGISTERED_B).

Incidentally, here, a case has been described in which the state management unit 149 does not distinguish the transitions by the first and second registration processes. However, the transitions by the respective registration processes may be distinguished and managed. In this case, the state management unit 149 manages the PLMN by dividing the PLMN into the home PLMN state (for example, RM-REGISTERED) and the visitor PLMN state (for example, RM-REGISTERED-R) by, for example, the second registration process.

Hereinbefore, the functional configuration examples of the management device 10 and the wireless communication device 100 according to the embodiment of the present disclosure have been described. Subsequently, an operation example of the communication system according to the embodiment of the present disclosure will be described.

<4. Operation of Communication System>
<4.1. Registration Activation Process>

First, a registration activation process performed by the wireless communication device 100 will be described with reference to FIGS. 9 to 12. The registration activation process is a process performed before the registration process is executed.

Figure 9:
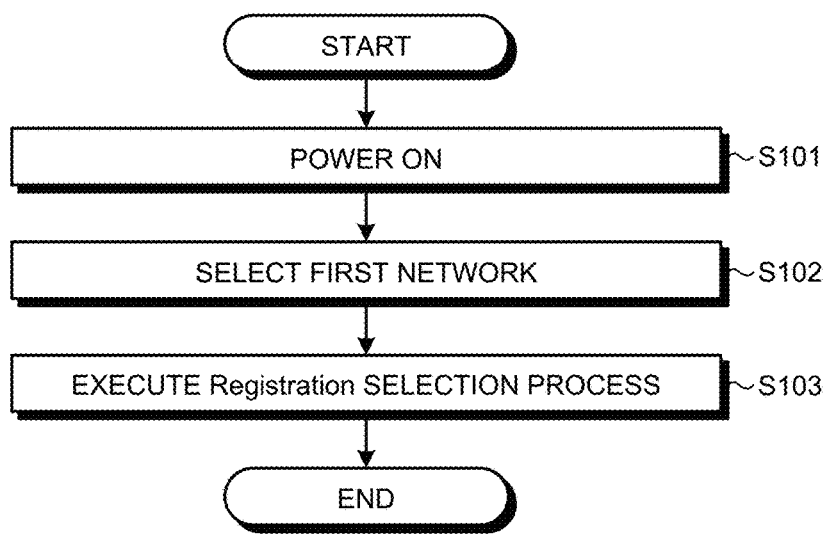
FIG. 9 is a flowchart (1) illustrating an example of a registration activation process according to the embodiment of the present disclosure.
Figure 10:
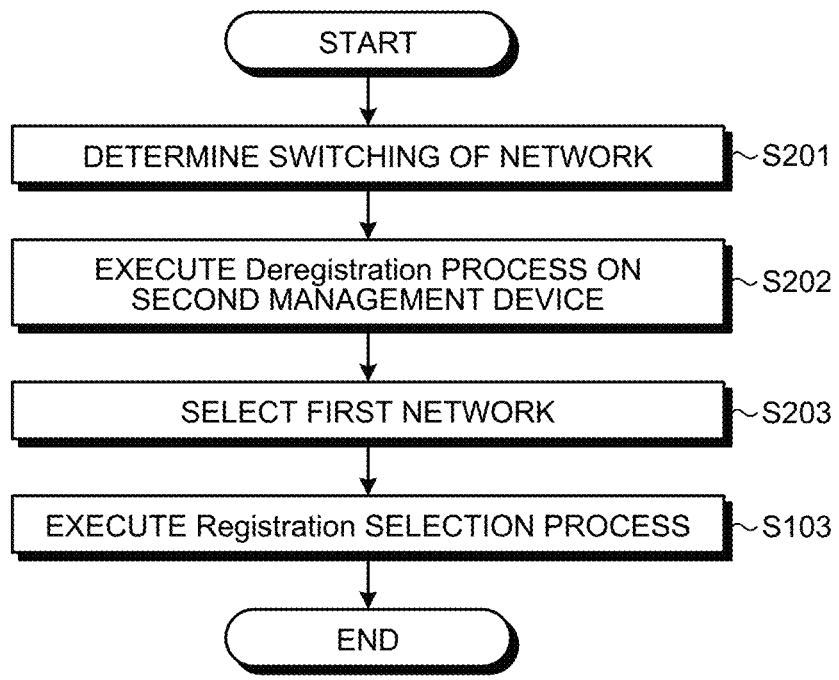
FIG. 10 is a flowchart (2) illustrating an example of the registration activation process according to the embodiment of the present disclosure.
Figure 11:
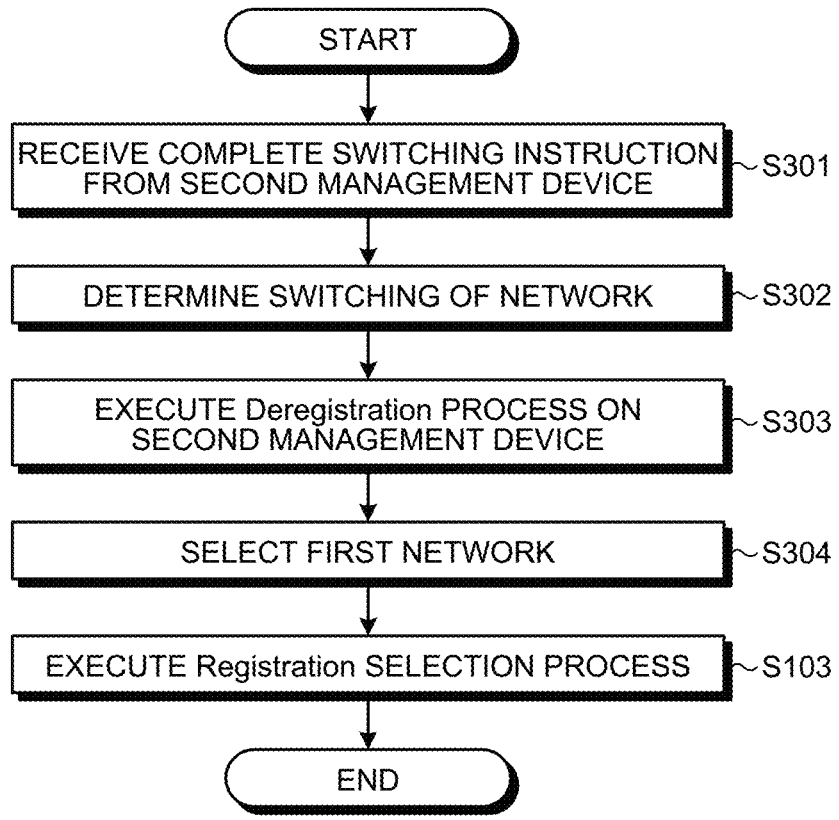
FIG. 11 is a flowchart (3) illustrating an example of the registration activation process according to the embodiment of the present disclosure.
Figure 12:
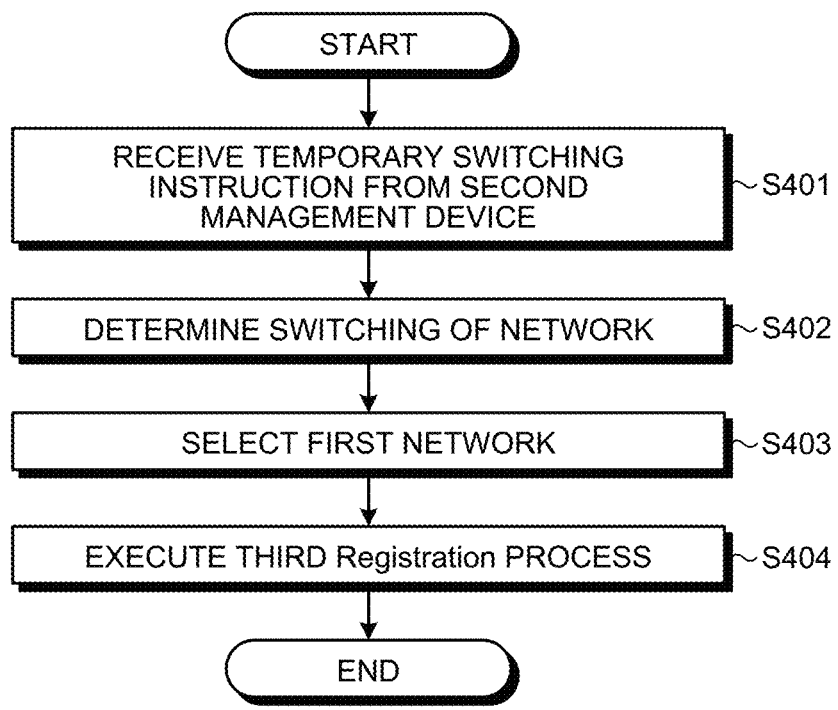
FIG. 12 is a flowchart (4) illustrating an example of the registration activation process according to the embodiment of the present disclosure.

FIG. 9 is a flowchart (1) illustrating an example of the registration activation process according to the embodiment of the present disclosure. FIG. 10 is a flowchart (2) illustrating an example of the registration activation process according to the embodiment of the present disclosure. FIG. 11 is a flowchart (3) illustrating an example of the registration activation process according to the embodiment of the present disclosure. FIG. 12 is a flowchart (4) illustrating an example of the registration activation process according to the embodiment of the present disclosure.

As described above, the wireless communication device 100 activates the registration process at a predetermined timing such as when the power is turned on. Here, three cases of (1) the time the power is turned on, (2) an instruction from a user or an upper layer, and (3) an instruction from the management device 10 will be described as the predetermined timing.

<4.1.1. When Power is Turned On>

First, an example of the registration activation process (1) at the time the power is turned on will be described with reference to FIG. 9. In this case, first, the power of the wireless communication device 100 is turned on (step S101). Subsequently, the switching control unit 141 of the wireless communication device 100 selects the first network 20A connected before the power is turned off as a connection destination (step S102). That is, the wireless communication device 100 (for example, the wireless communication device 100 (mobile equipment) configuring the UE 1) acquires the PLMN list from the first SIM 30A (USIM).

Subsequently, the wireless communication device 100 executes a registration selection process (step S103).

Incidentally, here, the wireless communication device 100 selects the previous connection destination as the selection of the connection destination at the time the power is turned on, but the present invention is not limited thereto. For example, the priority of the connection destination may be held in advance, and the wireless communication device 100 may select the connection destination (for example, PLMN) at the time the power is turned on according to the priority.

<4.1.2. Switching Instruction from Upper Layer>

Next, an example of the registration activation process performed on the basis of (2) an instruction from a user or an upper layer will be described with reference to FIG. 10. Here, it is assumed that the second network 20B is connected. In this case, the UE 1 is registered in the second management device 10B (for example, AMF), and the wireless communication device 100 manages the second PLMN as the home PLMN. Incidentally, it does not matter whether or not the second management device 10B manages the first PLMN as the visitor PLMN.

As illustrated in FIG. 10, when receiving an instruction (for example, a PLMN switching instruction or a SIM 30 (USIM) switching instruction) to switch the connection destination of the network 20 from the user or the upper layer, the wireless communication device 100 determines the switching of the network 20 (step S201).

Subsequently, the deregistration processing unit 148 of the wireless communication device 100 executes the deregistration process on the second management device 10B belonging to the second PLMN which is the home PLMN (step S202).

The switching control unit 141 of the wireless communication device 100 selects the first network 20A as the connection destination in accordance with the switching instruction from the user or the upper layer (step S203). Then, the wireless communication device 100 executes the registration selection process (step S103).

<4.1.3. Switching Instruction from Management Device>

An example of the registration activation process performed on the basis of (3) an instruction from the management device 10 will be described with reference to FIGS. 11 and 12. In this case, the first PLMN is managed as the visitor PLMN in the second management device 10B.

Here, first, a case where the wireless communication device 100 receives a complete switching instruction from the second management device 10B will be described with reference to FIG. 11, and next, a case where the wireless communication device 100 receives a temporary switching instruction will be described with reference to FIG. 12.

(Complete Switching Instruction)

As illustrated in FIG. 11, the wireless communication device 100 receives the complete switching instruction from the second management device 10B (step S301). When receiving the complete switching instruction, the wireless communication device 100 determines switching of the network 20 (step S302).

Subsequently, the deregistration processing unit 148 of the wireless communication device 100 executes the deregistration process on the second management device 10B belonging to the second PLMN which is the home PLMN (step S303).

The switching control unit 141 of the wireless communication device 100 selects the first network 20A as the connection destination in accordance with the complete switching instruction (step S304). Then, the wireless communication device 100 executes the registration selection process (step S103).

(Temporary Switching Instruction)

As illustrated in FIG. 12, the wireless communication device 100 receives the temporary switching instruction from the second management device 10B (step S401). When receiving the temporary switching instruction, the wireless communication device 100 determines temporary switching of the network 20 during the second timer period T2 (step S402).

In this case, unlike a case where the complete switching instruction is received, the wireless communication device 100 selects the first PLMN (in other words, the first network 20A) as the connection destination without executing the deregistration process on the second management device 10B (in other words, does not become in RM-DEREGIS- TERED) (step S403). Then, the wireless communication device 100 executes the third registration process (step S404). Specifically, the registration processing unit 147 of the wireless communication device 100 transmits the third Registration request including the second timer period T2 as the third registration process to the first management device 10A.

<4.2. Registration Selection Process>

Figure 13:
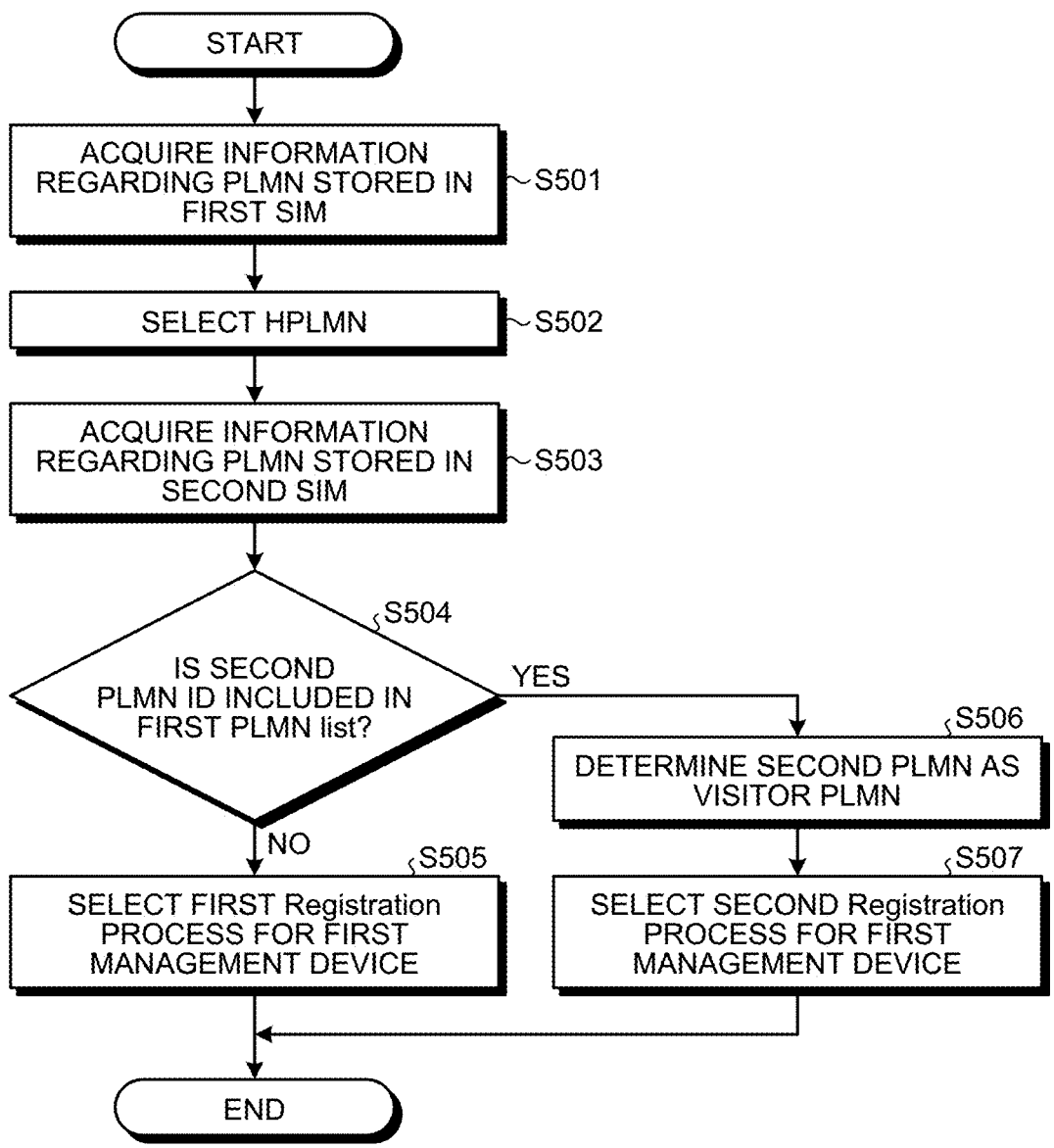
FIG. 13 is a flowchart illustrating an example of a registration selection process according to the embodiment of the present disclosure.

Next, an example of the registration selection process will be described with reference to FIG. 13. FIG. 13 is a flowchart illustrating an example of the registration selection process according to the embodiment of the present disclosure. The registration selection process is executed, for example, with the registration activation process by the wireless communication device 100 as a trigger.

As illustrated in FIG. 13, the first acquisition unit 142 of the wireless communication device 100 acquires the information regarding the PLMN stored in the first SIM 30A (step S501). The first acquisition unit 142 acquires, for example, the first PLMN list 40.

Subsequently, the selection unit 143 of the wireless communication device 100 selects an HPLMN from the first PLMN list 40 (step S502). Next, the second acquisition unit 144 of the wireless communication device 100 acquires the information regarding the PLMN stored in the second SIM 30B (step S503). The second acquisition unit 144 acquires the second PLMN ID from the second SIM 30B, for example.

The determination unit 145 of the wireless communication device 100 determines whether or not the second PLMN ID is included in the first PLMN list 40 (step S504). In a case where the second PLMN ID is not included in the first PLMN list 40 (step S504; No), the registration selection unit 146 of the wireless communication device 100 selects the first registration process for the first management device 10A belonging to the HPLMN (step S505).

On the other hand, in a case where the second PLMN ID is included in the first PLMN list 40 (step S504; Yes), the registration selection unit 146 determines the second PLMN as the visitor PLMN (step S506), and selects the second registration process for the first management device 10A (step S507).

<4.3. Details of Registration Selection Process>

Figure 14:
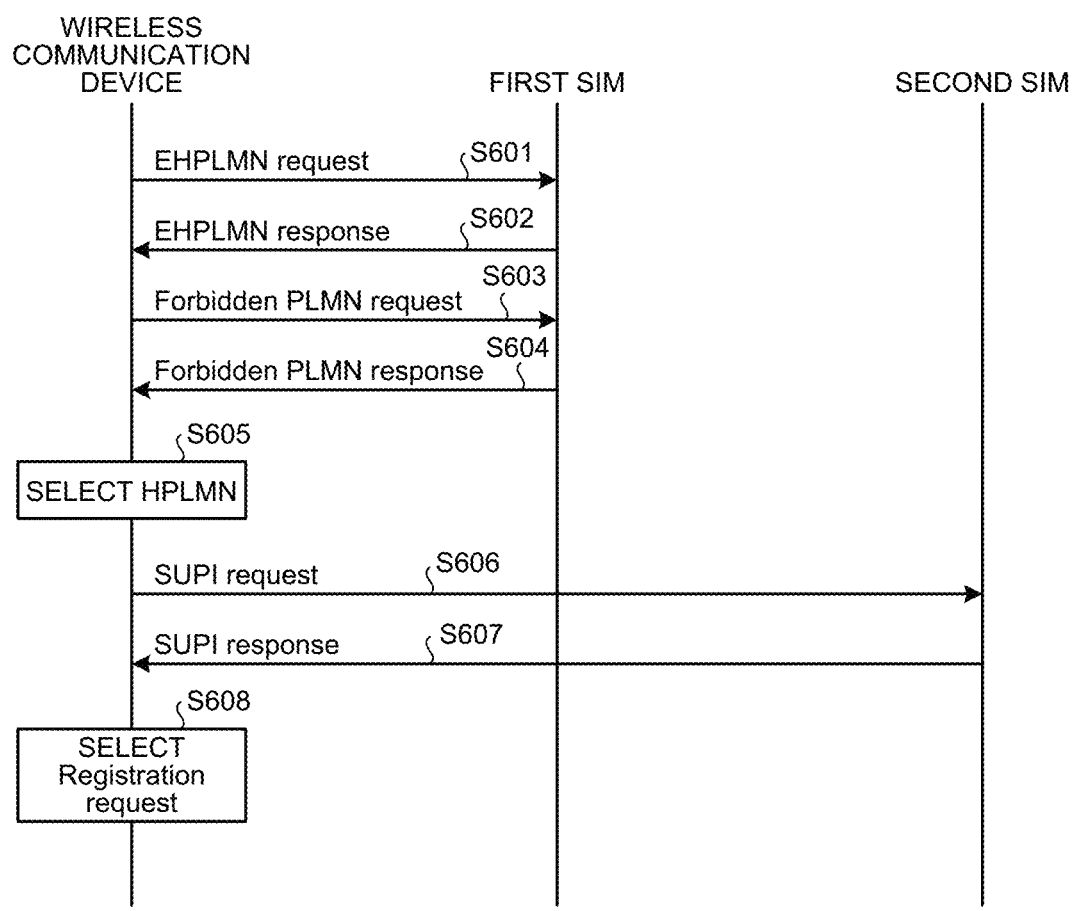
FIG. 14 is a sequence diagram for explaining the registration selection process.

Details of the registration selection process including the communication with the SIM 30 will be described with reference to FIG. 14. FIG. 14 is a sequence diagram for explaining the registration selection process.

The wireless communication device 100 (hereinafter, also referred to as a mobile equipment (ME) 100) performs a USIM initialization procedure. More specifically, the ME 100 transmits an equivalent home PLMN (EHPLMN) request to acquire information in elementary file_EHPLMN (EF_EHPLMN) in the first SIM 30A (USIM) (step S601). In response to this, the first SIM 30A transmits an EHPLMN response (step S602). Accordingly, the wireless communication device 100 acquires an EHPLMN list from the first SIM 30A.

Next, the wireless communication device 100 transmits a forbidden PLMN request to acquire information in EF_FPLMN in the first SIM 30A (USIM) (step S603). In response, the first SIM 30A transmits a forbidden PLMN response (step S604). Accordingly, the wireless communication device 100 acquires a forbidden PLMN list which is an unselectable PLMN.

The wireless communication device 100 selects a HPLMN from the first PLMN list 40 obtained by removing the forbidden PLMN from the EHPLMN list (step S605). On the basis of the priority, the wireless communication device 100 selects, as the HPLMN, an available PLMN with a higher priority among PLMN candidates which are included in the EHPLMN list and are not included in the forbidden PLMN list, for example.

Here, in a case where the EHPLMN list does not exist, or the EHPLMN list is empty, the wireless communication device 100 may request the first SIM 30A to transmit a subscriber permanent identifier (SUPI). In this case, the wireless communication device 100 selects the HPLMN included in the SUPI to which the first SIM 30A responds. At this time, the wireless communication device 100 may transmit an HPLMN selector with Access Technology request to the first SIM 30A, and check an access technology (for example, 5G (NR) or 4G (EUTRA)) supported by the HPLMN acquired from the SUPI from the information obtained as a result of the response.

The wireless communication device 100 may transmit an Operator controlled PLMN Selector with Access Technology request and a User Controlled PLMN Selector with Access Technology request to the first SIM 30A in addition to the EHPLMN request. In this case, the wireless communication device 100 may select an HPLMN from the first PLMN list 40 included in the response from the first SIM 30A. Incidentally, the wireless communication device 100 only needs to transmit at least one of the EHPLMN request, the Operator controlled PLMN Selector with Access Technology request, and the User Controlled PLMN Selector with Access Technology request to the first SIM 30A, and does not necessarily need to transmit all of them.

Subsequently, the wireless communication device 100 requests the SUPI as the second PLMN ID from the second SIM 30B (step S606). In response to this, the second SIM 30B transmits a SUPI response (step S607). Accordingly, the wireless communication device 100 acquires the second PLMN ID.

Incidentally, here, the wireless communication device 100 acquires the second PLMN ID, but the present invention is not limited thereto. The wireless communication device 100 may acquire a second PLMN list including a plurality of second PLMN IDs. In this case, similarly to the first PLMN list 40, the wireless communication device 100 may acquire the second PLMN list on the basis of the EHPLMN list and the forbidden PLMN list which are stored in the second SIM 30B.

The wireless communication device 100 determines whether or not the second PLMN ID is included in the first PLMN list 40, and selects a Registration request to be transmitted to the first management device 10A (step S608).

Incidentally, in the case of acquiring the second PLMN list from the second SIM 30B, for all the second PLMN candidates included in the second PLMN list, the wireless communication device 100 determines whether or not the second PLMN candidate is included in the first PLMN list 40. In a case where all the second PLMN candidates are not included in the first PLMN list 40, the wireless communication device 100 determines to execute the first registration process.

On the other hand, in a case where at least one of the second PLMN candidates is included in the first PLMN list 40, the wireless communication device 100 determines to execute the second registration process. At this time, when there is one second PLMN candidate included in the first PLMN list 40, the wireless communication device 100 determines the relevant second PLMN candidate as the second PLMN to be included in the second Registration. In a case where there is a plurality of second PLMN candidates included in the first PLMN list 40, the wireless communication device 100 determines a second PLMN candidate with a higher priority as the second PLMN to be included in the second Registration.

<4.4. Registration Process>

Subsequently, the registration process performed by the wireless communication device 100 will be described with reference to FIGS. 15 to 18. Incidentally, in the following description, in addition to the registration process by the wireless communication device 100, the communication with the management device 10 will also be described.

<4.4.1. First Registration Process>

Figure 15:
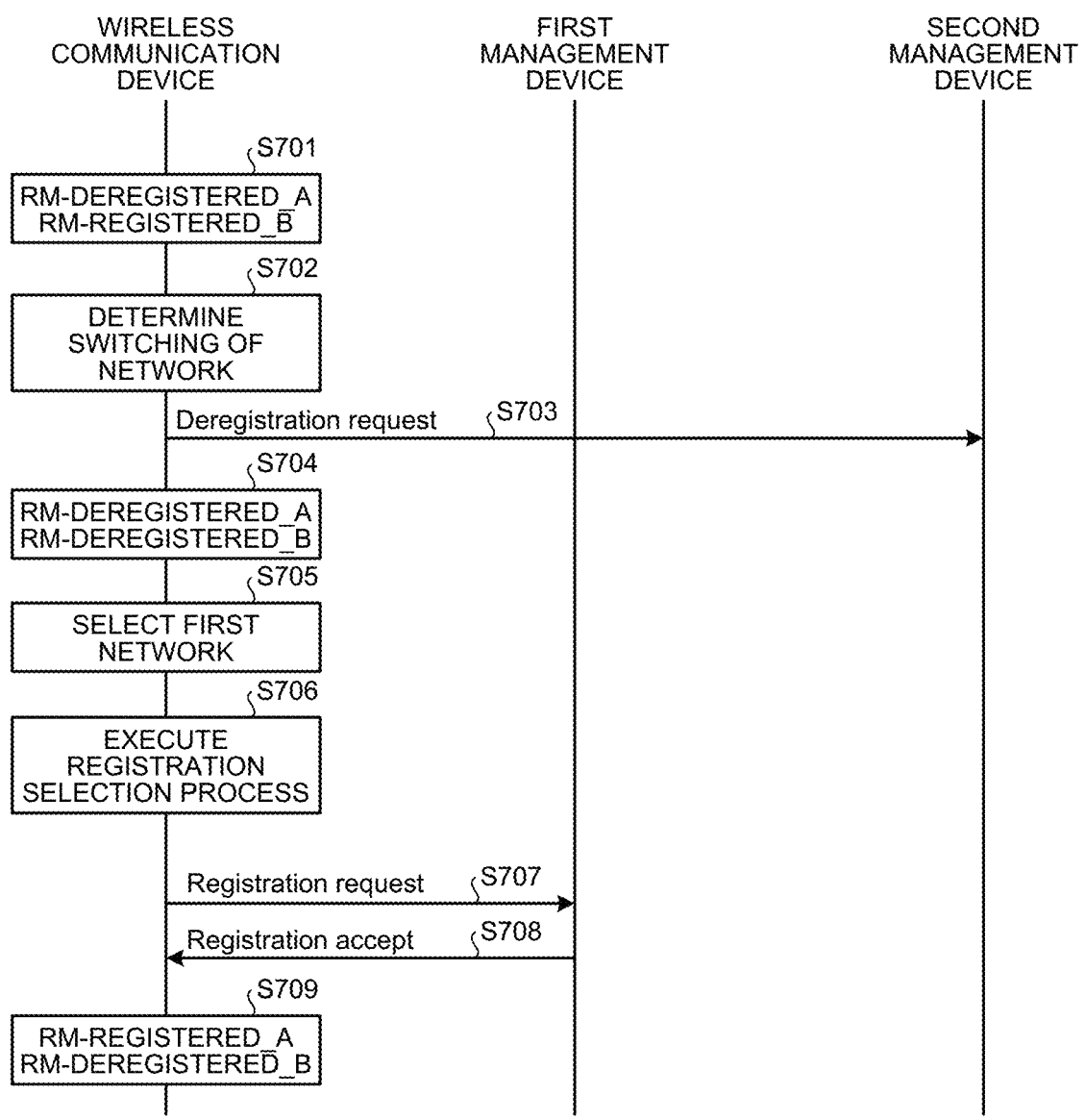
FIG. 15 is a sequence diagram for explaining an example of a first registration process.

First, the first registration process will be described with reference to FIG. 15. FIG. 15 is a sequence diagram for explaining an example of the first registration process. The first registration process is selected in a case where the second PLMN ID is not included in the first PLMN list 40. In FIG. 15, the flow of the first registration process including the registration activation process will be described by taking a case where an instruction from the upper layer is received as an example.

The wireless communication device 100 performs management in a state where the UE 1 (or the wireless communication device 100) is not registered in the first management device 10A (RM-DEREGISTERED_A), and the UE 1 is registered in the second management device 10B (RM-REGISTERED_B) (step S701). In this state, when there is an instruction from the upper layer, the wireless communication device 100 determines the switching of the network 20, that is, the switching of the registration destination PLMN (step S702).

The wireless communication device 100 transmits a Deregistration (registration deletion) request to the second management device 10B in which the UE 1 is registered (step S703). The wireless communication device 100 causes both the first and second PLMNs to transition to the non-registration (RM-DEREGISTERED_A, RM-DEREGISTERED_B) state (step S704).

The wireless communication device 100 selects the first network 20A as the network 20 (for example, a network to be switched with the switching of the SIM 30 (USIM)) to be switched (step S705). In other words, the wireless communication device 100 selects the first PLMN as the PLMN to be registered, and executes the registration selection process (step S706).

The wireless communication device 100 which selects the first registration process in the registration selection process executes the following first registration process.

First, the wireless communication device 100 transmits a Registration request to the first management device 10A (step S707). At this time, the wireless communication device 100 transmits the Registration request without including the second PLMN ID.

Here, when the 5G-globally unique temporary identifier (GUTI) allocated from the first PLMN to which the first management device 10A belongs is available, the wireless communication device 100 transmits the Registration request with the 5G-GUTI included therein. On the other hand, in a case where the allocated 5G-GUTI is not available, the wireless communication device 100 transmits the Registration request with the 5G-GUTI allocated from another PLMN (for example, the second PLMN to which the second management device 10B belongs), included therein.

Incidentally, in a case where the wireless communication device 100 does not have the available 5G-GUTI, the wireless communication device 100 transmits the Registration request with a subscription concealed identifier (SUCI) generated from the SUPI stored in the first SIM 30A, included therein.

Subsequently, when registering the UE 1, the first management device 10A transmits a Registration accept to the wireless communication device 100 (step S708).

Here, in the case of not acquiring a permanent equipment identifier (PEI) which is identification information (UE identity) of the UE 1, the first management device 10A transmits an identity request to the wireless communication device 100 to acquire the PEI of the UE 1. The PEI is, for example, an international mobile equipment identity (IMEI). Incidentally, the first management device 10A may acquire the SUCI instead of the PEI.

The wireless communication device 100 transitions the first PLMN to the registration state (RM-REGISTERED_A) and the second PLMN to the non-registration (RM-DEREGISTERED_B) state (step S709), and ends the first registration process.

Incidentally, here, the wireless communication device 100 causes both the first and second PLMNs to transition to the non-registration state after transmitting the Deregistration request, but the present invention is not limited thereto. For example, the wireless communication device 100 may transition the states of the first and second PLMNs after receiving the Registration accept. In this case, the wireless communication device 100 can directly transition the states of the first and second PLMNs from "RM-DEREGISTERED_A, RM-REGISTERED_B" to "RM-REGISTERED_A, RM-DEREGISTERED_B". Incidentally, such a transition may be similarly performed also in the following FIGS. 16 and 17.

<4.4.2. Second Registration Process>

Figure 16:
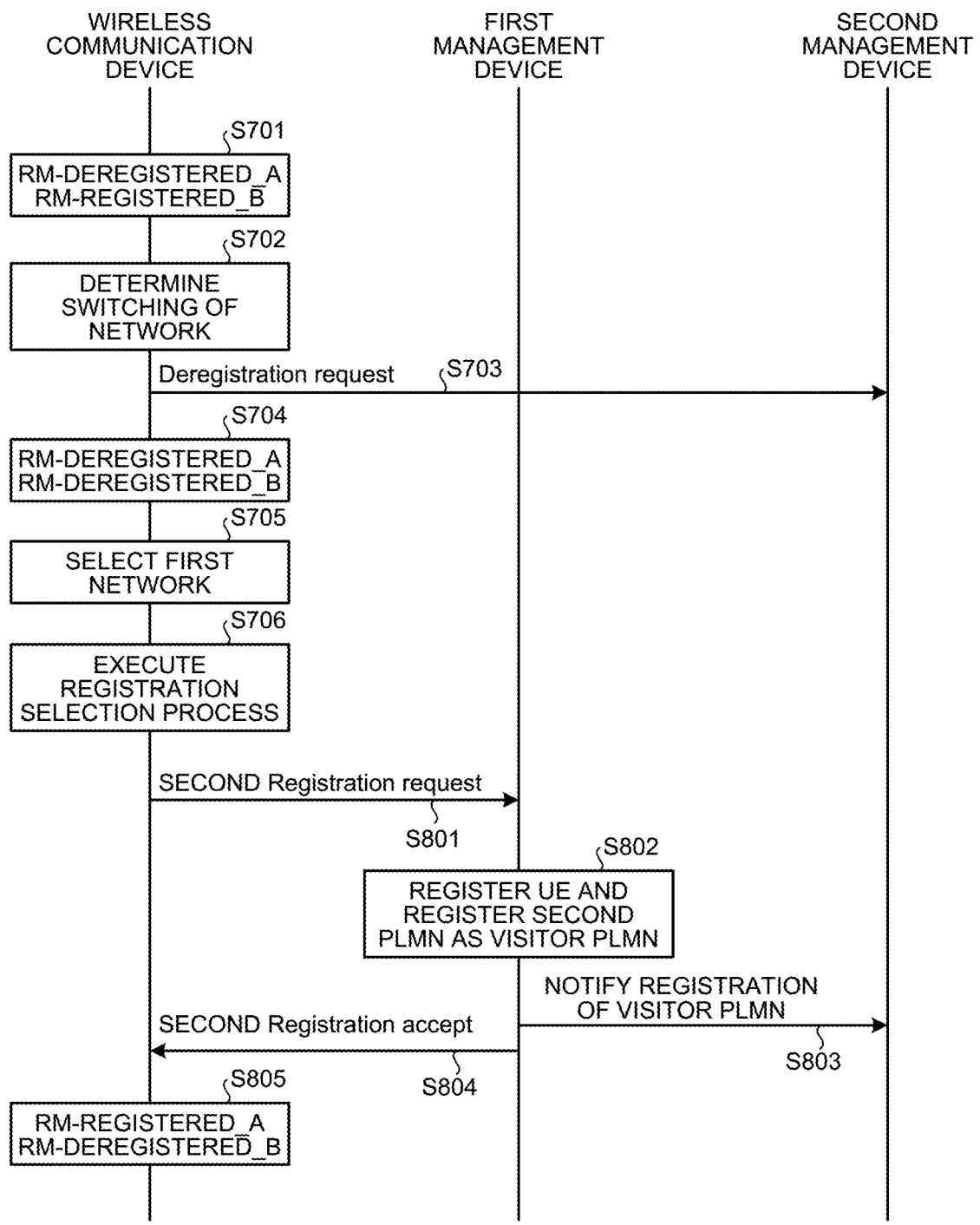
FIG. 16 is a sequence diagram for explaining an example of a second registration process.

Next, the second registration process will be described with reference to FIG. 16. FIG. 16 is a sequence diagram for explaining an example of the second registration process. The second registration process is selected in a case where the second PLMN ID is included in the first PLMN list 40. Incidentally, the registration activation process is the same as that in FIG. 15, and thus the same reference signs are given, and the description thereof is omitted.

The wireless communication device 100 which selects the second registration process in the registration selection process in step S706 executes the following second registration process.

First, the wireless communication device 100 transmits a second Registration request to the first management device 10A (step S801). The second Registration request includes the second PLMN ID.

Here, when the 5G-GUTI allocated from the first PLMN to which the first management device 10A belongs is available, the wireless communication device 100 transmits the second Registration request with the 5G-GUTI included therein. On the other hand, in a case where the allocated 5G-GUTI is not available, the wireless communication device 100 transmits the second Registration request with the 5G-GUTI allocated from another PLMN (for example, the second PLMN to which the second management device 10B belongs), included therein.

Incidentally, in a case where the wireless communication device 100 does not have the available 5G-GUTI, the wireless communication device 100 transmits the second Registration request with the SUCI generated from the SUPI stored in the first SIM 30A, included therein.

The wireless communication device 100 may include information regarding the paging priority in the second Registration request. Here, the information regarding the paging priority is information indicating priorities of the first paging addressed to the SUPI stored in the first SIM 30A and the second paging addressed to the SUPI stored in the second SIM 30B. In a case where the timings of the first paging and second paging overlap, the first management device 10A gives priority to one paging on the basis of such information. In a case where such information is not included in the second Registration request, the first management device 10A may prioritize the first paging addressed to the SUPI stored in the first SIM 30A managed as the home PLMN.

Subsequently, the first management device 10A which receives the second Registration request registers the UE 1 and registers the second PLMN ID as the visitor PLMN (step S802).

Here, in the case of not acquiring a permanent equipment identifier (PEI) which is identification information (UE identity) of the UE 1, the first management device 10A transmits an identity request to the wireless communication device 100 to acquire the PEI of the UE 1. The PEI is, for example, IMEI. Incidentally, the first management device 10A may acquire the SUCI instead of the PEI.

The first management device 10A notifies the second management device 10B belonging to the second PLMN that the second PLMN is registered as the visitor PLMN (step S803). Further, the first management device 10A transmits a second Registration accept to the wireless communication device 100 to notify that the registration of the UE 1 is completed (step S804).

The wireless communication device 100 transitions the first PLMN to the registration state (RM-REGISTERED_A) and the second PLMN to the non-registration (RM-DEREGISTERED_B) state (step S805), and ends the second registration process. Here, the wireless communication device 100 may receive a notification indicating that the second PLMN is registered as the visitor PLMN via the second Registration accept message, and transition the first PLMN to the home PLMN registration state (RM-REGISTERED_A) and the second PLMN to the visitor PLMN registration state (RM-REGISTERED_R_B). Accordingly, the wireless communication device 100 monitors the first paging addressed to the SUPI stored in the first SIM 30A and the second paging addressed to the SUPI stored in the second SIM 30B for the network of the first PLMN to which the first management device 10A belongs.

Figure 17:
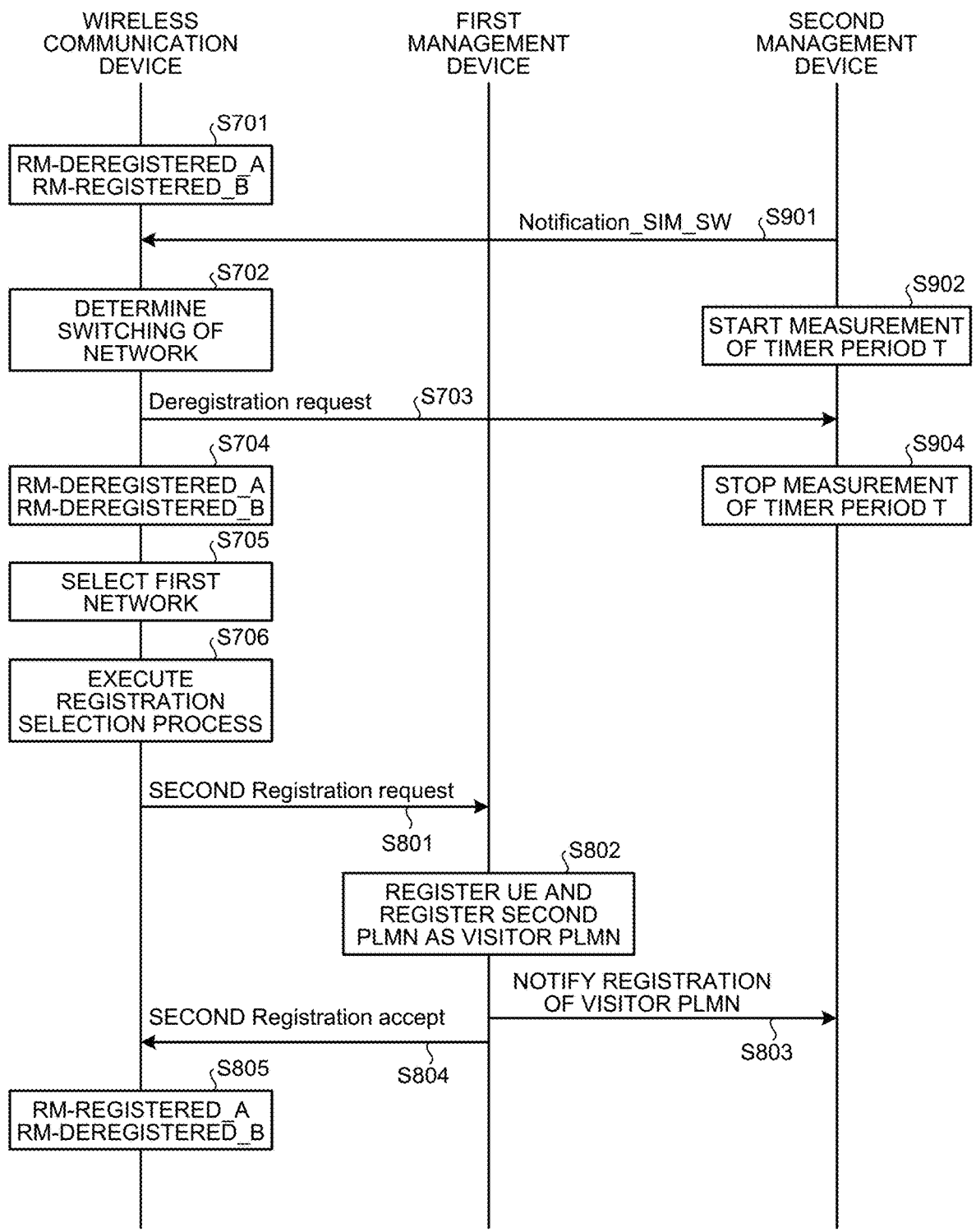
FIG. 17 is a sequence diagram for explaining another example of the second registration process.

A flow until the second registration process is executed in a case where an instruction from the management device 10 is received will be described with reference to FIG. 17. FIG. 17 is a sequence diagram for explaining another example of the second registration process.

In a state where the first PLMN is managed as the non-registration state (RM-DEREGISTERED_A), and the second PLMN is managed as the registration state (RM-REGISTERED_B), the wireless communication device 100 receives Notification_SIM_SW from the second management device 10B (step S901). Notification_SIM_SW is a complete switching instruction that instructs switching of the connection destination network 20, that is, switching of the registration destination PLMN. Incidentally, the second management device 10B may transmit Notification_SIM_SW with a unique identifier of the network of the switching destination included therein. Here, examples of the unique identifier of the network include a PLMN ID, a non-public network (NPN) ID, and a neutral host network (NHN) ID.

When transmitting Notification_SIM_SW, the second management device 10B starts measuring the timer period T (step S902).

The wireless communication device 100 which receives Notification_SIM_SW determines the switching of the network 20, that is, the switching of the PLMN to be registered according to the instruction from the second management device 10B (step S702).

The second management device 10B which receives the Deregistration request from the wireless communication device 100 (step S703) stops measuring the timer period T (step S904). Incidentally, in a case where the timer period T has elapsed before receiving the Deregistration request, the second management device 10B returns to step S901 and retransmits Notification_SIM_SW.

Incidentally, the second management device 10B may determine whether or not to transmit Notification_SIM_SW to the UE 1 on the basis of the UE radio capability acquired from the UE 1. That is, the second management device 10B transmits Notification_SIM_SW to the UE 1 having such UE radio capability that a plurality of SIMs 30 can be mounted. On the other hand, Notification_SIM_SW is not transmitted to the UE 1 having such UE radio capability that does not support a plurality of SIMs 30.

<4.4.3. Third Registration Process>

Figure 18:
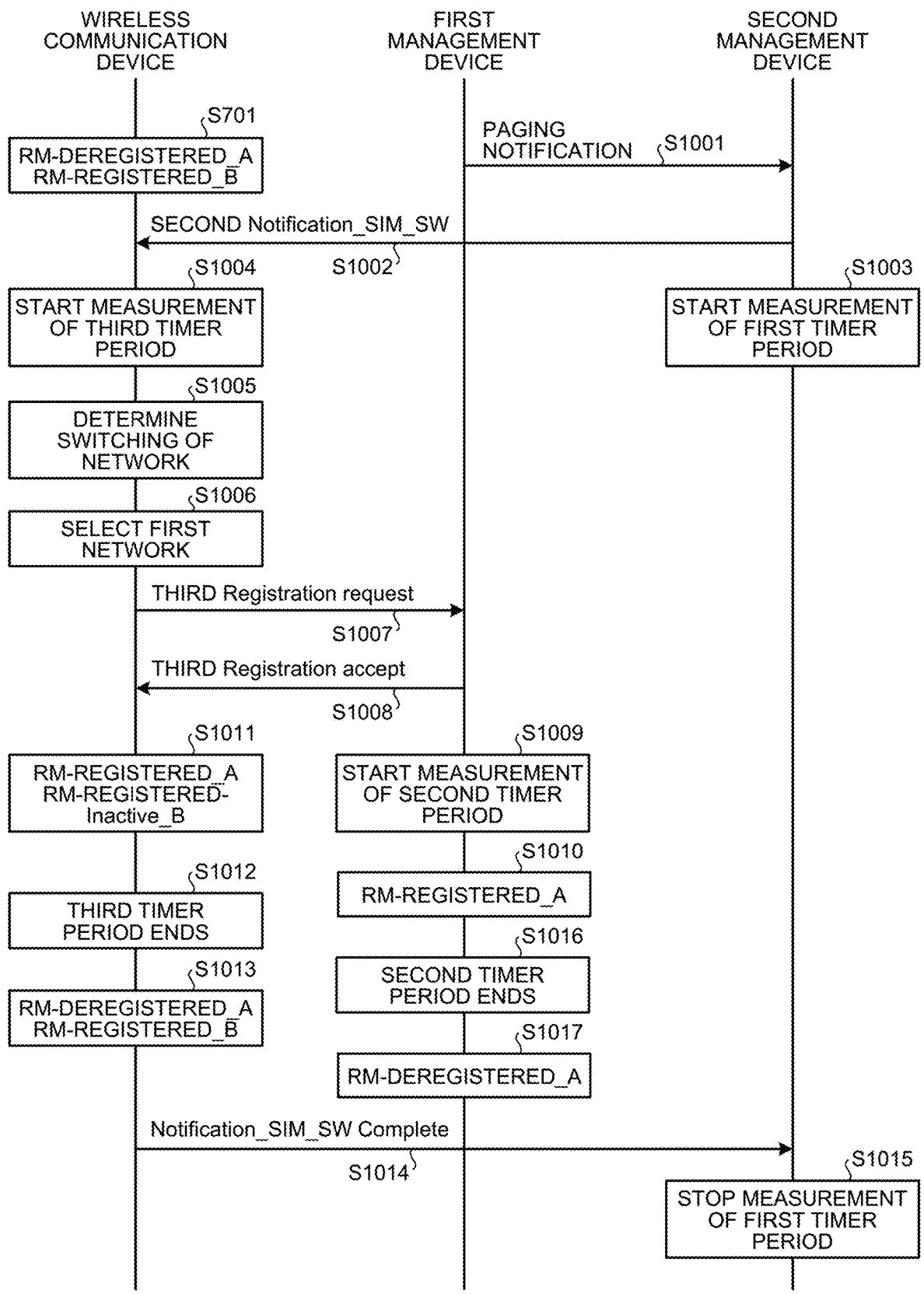
FIG. 18 is a sequence diagram for explaining an example of a third registration process.

Next, the third registration process will be described with reference to FIG. 18. FIG. 18 is a sequence diagram for explaining an example of the third registration process. The third registration process is executed in a case where the temporary switching instruction is received from the management device 10. In FIG. 18, the flow of the third registration process including the reception of the temporary switching instruction from the second management device 10B will be described.

For example, in a case where a notification (paging notification) regarding paging addressed to the wireless communication device 100 is received from the first management device 10A (step S1001), the second management device 10B transmits second Notification_SIM_SW to the wireless communication device 100 (step S1002) and starts measuring the first timer period T1 (step S1003). The second Notification_SIM_SW is a temporary switching instruction including the first timer period T1.

The second management device 10B may include the first PLMN ID corresponding to the first SIM 30A in the second Notification_SIM_SW. Further, the second management device 10B may include a third timer period T3 to be described later instead of the first timer period T1.

When receiving the second Notification_SIM_SW from the second management device 10B, the wireless communication device 100 starts measuring the third timer period T3 according to the first timer period T1 (step S1004). The third timer period T3 may be a same period as the first timer period T1 or may be a period shorter than the first timer period T1.

The wireless communication device 100 determines the switching of the network 20, that is, the switching of the PLMN to be registered according to the instruction from the second management device 10B (step S1005). Further, the wireless communication device 100 selects the first network 20A as the network 20 to be switched (step S1006). In other words, the wireless communication device 100 selects the first PLMN as the PLMN to be registered.

Subsequently, the wireless communication device 100 executes the third registration process described below.

Specifically, the wireless communication device 100 transmits a third Registration request to the first management device 10A (step S1007). The third Registration request includes the second timer period T2 according to the first and third timer periods T1 and T3. Incidentally, the second timer period T2 may be the same as or shorter than the first and third timer periods T1 and T3.

Here, when the 5G-GUTI allocated from the first PLMN to which the first management device 10A belongs is available, the wireless communication device 100 transmits the third Registration request with the 5G-GUTI included therein. On the other hand, in a case where the allocated 5G-GUTI is not available, the wireless communication device 100 transmits the third Registration request with the 5G-GUTI allocated from another PLMN (for example, the second PLMN to which the second management device 10B belongs), included therein.

Incidentally, in a case where the wireless communication device 100 does not have the available 5G-GUTI, the wireless communication device 100 transmits the third Registration request with the SUCI generated from the SUPI stored in the first SIM 30A, included therein.

When receiving the third Registration request, the first management device 10A transmits a third Registration accept (step S1008) and starts measuring the second timer period T2 (step S1009).

Here, in the case of not acquiring a permanent equipment identifier (PEI) which is identification information (UE identity) of the UE 1, the first management device 10A transmits an identity request to the wireless communication device 100 to acquire the PEI of the UE 1. The PEI is, for example, IMEI. Incidentally, the first management device 10A may acquire the SUCI instead of the PEI.

Subsequently, the first management device 10A manages the first PLMN stored in the first SIM 30A as the registration state (RM-REGISTERED_A) (step S1010). The first management device 10A transmits paging addressed to the SUPI stored in the first SIM 30A to the wireless communication device 100 during the second timer period T2.

The wireless communication device 100 which receives the third Registration accept manages the first PLMN as the registration state (RM-REGISTERED_A) and the second PLMN as the deemed non-registration state (RM-REGISTERED-Inactive_B) (step S1011). The wireless communication device 100 receives paging from the first management device 10A after receiving the third Registration accept until the third timer period T3 ends. The wireless communication device 100 receives paging via, for example, the gNB/ng-eNB belonging to the first PLMN included in the second Notification_SIM_SW.

When the third timer period T3 ends (step S1012), the wireless communication device 100 causes the first PLMN to transition to the non-registration state (RM-DEREGISTERED_A) and the second PLMN to transition to the registration state (RM-REGISTERED_B) (step S1013).

The wireless communication device 100 transmits Notification_SIM_SW Complete to the second management device 10B to notify that the communication with the first management device 10A is ended (step S1014). The second management device 10B which receives Notification_SIM_SW Complete stops measuring the first timer period T1 (step S1015). Thereafter, the second management device 10B resumes the stopped communication with the wireless communication device 100, for example. In other words, in a case where a paging request addressed to the SUPI stored in the second SIM 30B is generated during the measurement of the first timer period T1, the second management device 10B executes paging after waiting for the end of the first timer period T1 (or the stop of measurement).

In a case where the second timer period T2 ends after starting the measurement of the second timer period T2 in step S1009 (step S1016), the first management device 10A deletes the registration of the UE 1 and causes the UE 1 to transition to the non-registration state (RM-DEREGISTERED_A) (step S1017).

As described above, by registering the first PLMN only for a time, the wireless communication device 100 can omit the registration deletion request transmitted to the second management device 10B after determining the switching of the SIM 30. Further, the registration deletion request transmitted from the wireless communication device 100 to the first management device 10A after the third timer period T3 ends can be omitted. Therefore, traffic between the wireless communication device 100 and the management device 10 can be reduced.

Incidentally, here, the wireless communication device 100 waits for the end of the third timer period T3 and deletes the registration of the first PLMN, but the present invention is not limited thereto. For example, in a case where the communication regarding the paging generated in the first network 20A ends, the registration of the first PLMN may be deleted without waiting for the end of the third timer period T3.

As described above, when the registration of the first PLMN and the UE 1 is deleted at the time when the communication ends without waiting for the end of the second and third timer periods T2 and T3, it is possible to shorten an interruption time from the first management device 10A and lengthen a communication time between the wireless communication device 100 and the second management device 10B.

The wireless communication device 100 transmits Notification_SIM_SW Complete, but the present invention is not limited thereto. For example, the transmission of Notification_SIM_SW Complete by the wireless communication device 100 may be omitted. In this case, the second management device 10B waits for the end of the first timer period T1 and resumes the communication with the wireless communication device 100. Accordingly, the transmission of Notification_SIM_SW Complete by the wireless communication device 100 can be omitted, and the traffic between the wireless communication device 100 and the second management device 10B can be reduced.

Further, in a case where the first management device 10A transmits a paging notification to the second management device 10B, the information regarding the second timer period T2 may be included in the paging notification. Alternatively, the first management device 10A may include information regarding the size of data to be transmitted by paging in the paging notification.

As described above, the first management device 10A notifies the second management device 10B of the information regarding the timer and the size of the data, so that the period for switching the connection destination can be set to an appropriate period according to the size of the data.

(Network Slicing)

Here, in FIG. 18, a case where paging notified from the first management device 10A to the second management device 10B relates to a service by a specific network slice will be described. In this case, the first management device 10A includes, for example, network slice selection assistance information (NSSAI) corresponding to the network slice in the paging notification transmitted in step S1001 of FIG. 18.

The second management device 10B includes NSSAI in the second Notification_SIM_SW transmitted in step S1002.

The wireless communication device 100 which receives the second Notification_SIM_SW selects the first SIM 30A corresponding to the first PLMN ID included in the second Notification_SIM_SW. The wireless communication device 100 transmits, to the first management device 10A, the third Registration request with the requested NSSAI included therein in step S1007. In the case of permitting the registration, the first management device 10A which receives the third Registration request including the requested NSSAI transmits the third Registration accept including the allowed NSSAI in step S1008.

As described above, even when the paging relating to the service by the network slice occurs in the first network 20A, the wireless communication device 100 can appropriately switch the connection destination network 20 and perform paging.

<4.5. Selection Process of Switching Instruction>

Figure 19:
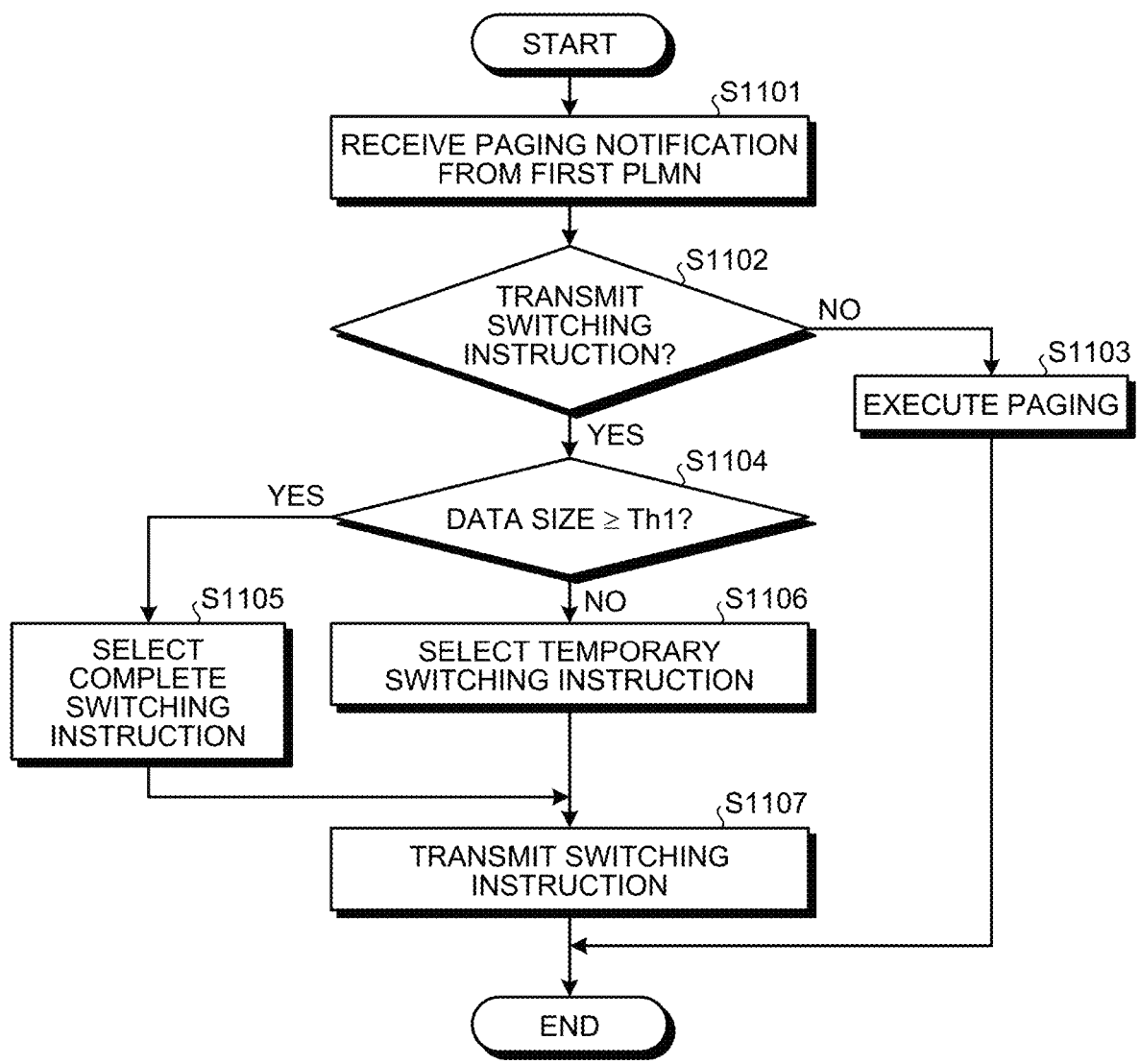
FIG. 19 is a flowchart for explaining a selection process of a switching instruction.

Subsequently, a switching instruction selection process performed by the management device 10 will be described with reference to FIG. 19. FIG. 19 is a flowchart for explaining the switching instruction selection process. Here, a case where the second management device 10B selects a switching instruction to be transmitted to the wireless communication device 100 will be described. It is assumed that the second management device 10B manages the first PLMN as the visitor PLMN and the second PLMN as the home PLMN.

When receiving a notification (paging notification) regarding paging from the first PLMN via the first management device 10A (step S1101), the second management device 10B determines whether or not to transmit a switching instruction to the wireless communication device 100 (step S1102). The second management device 10B determines whether or not to transmit the switching instruction according to, for example, the first PLMN or the contract with the user. Alternatively, the second management device 10B may determine whether the paging notification is a switching request of the network 20 or a paging transmission request via the second network 20B. In other words, whether or not to transmit the switching instruction may be determined according to a request from the first management device 10A.

In a case where it is determined not to transmit the switching instruction (step S1102; No), the second management device 10B executes paging for the wireless communication device 100 according to the paging notification received via the first management device 10A (step S1103).

For example, in a case where a roaming agreement is made with the first PLMN, the second management device 10B may provide a service similar to the first PLMN to the wireless communication device 100. In this regard, the second management device 10B executes paging addressed to the wireless communication device 100 generated in the first network 20A instead of the first management device 10A without transmitting the switching instruction.

On the other hand, in a case where it is determined to transmit the switching instruction (step S1102; Yes), the second management device 10B determines whether or not the paging size is equal to or larger than a predetermined threshold Th1 on the basis of the paging notification (step S1104).

In a case where the paging size is equal to or larger than the predetermined threshold Th1 (step S1104; Yes), the second management device 10B selects a complete switching instruction to completely switch the connection destination network 20 (step S1105). On the other hand, in a case where the paging size is less than the predetermined threshold Th1 (step S1104; No), the second management device 10B selects a temporary switching instruction to temporarily switch the connection destination during the first timer period T1 (step S1106). The second management device 10B transmits the selected switching instruction to the wireless communication device 100 (step S1107), and ends the process.

As described above, in a case where the paging size is small, by temporarily switching the connection destination network 20, the number of complete switching times of the connection destination including the registration deletion request can be reduced, and the traffic of the network 20 can be reduced.

Incidentally, in step S1101, it is assumed that paging addressed to the wireless communication device 100 also occurs in the second network 20B at the timing of receiving the paging notification from the first network 20A. In this case, the second management device 10B determines prioritized paging according to the paging priority. The paging priority is included in the second Registration request from the wireless communication device 100. In a case where the second PLMN is prioritized, the second management device 10B responds to the paging from the second network 20B, and then proceeds to step S1102. On the other hand, in a case where the first PLMN is prioritized, the second management device 10B directly proceeds to step S1102. After the wireless communication device 100 receives the paging generated in the first network 20A, the second management device 10B transmits the paging generated in the second network 20B to the wireless communication device 100.

<5. Application Example>

<5.1. Application Example of Radio Access Technology>

The technology according to the present disclosure can be applied to another radio access technology. For example, the communication system may employ LTE as a radio access technology or may employ both LTE and NR.

<5.1.1. Application Example to LTE>

(Configuration Example of Network Architecture)

Figure 20:
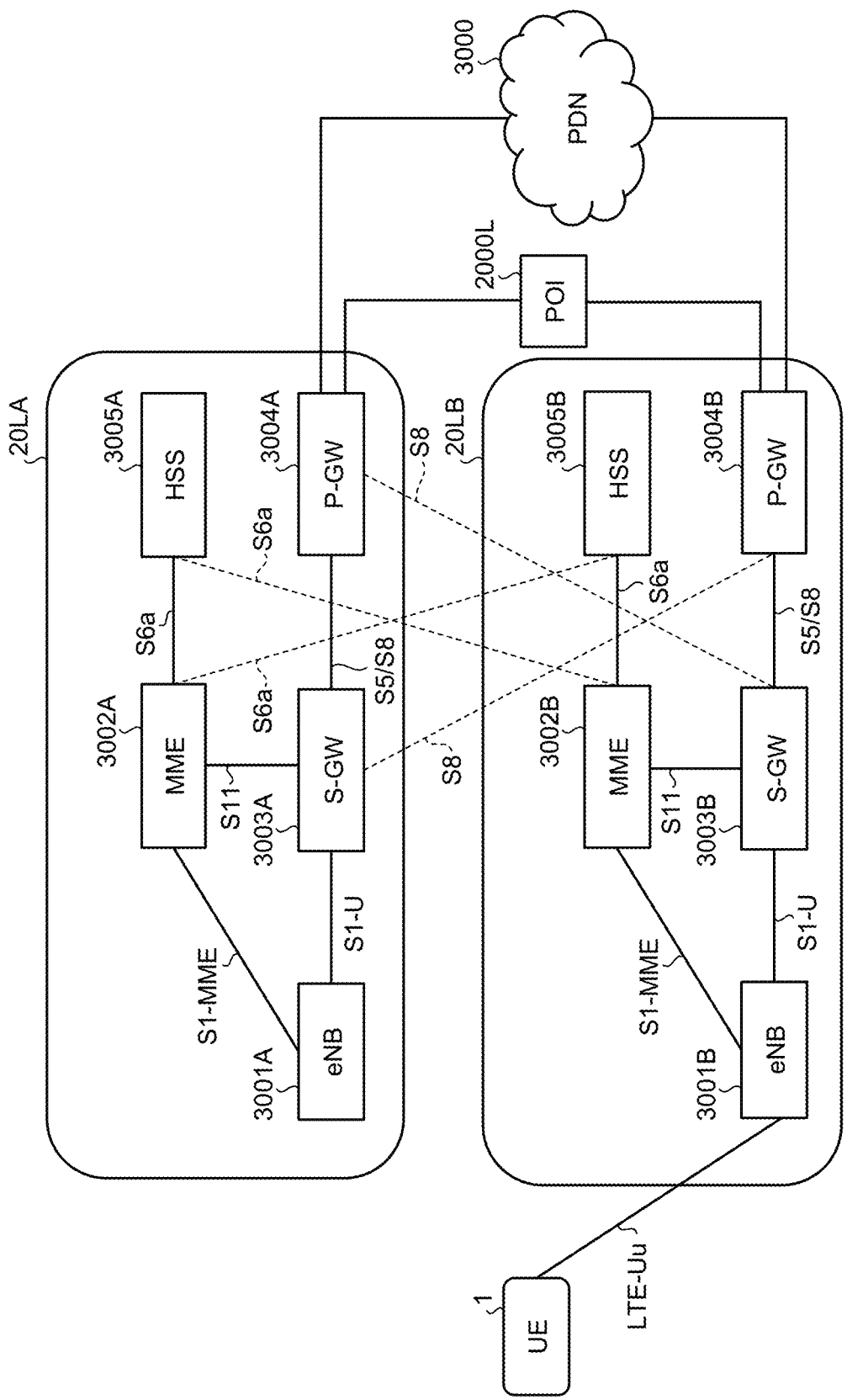
FIG. 20 is a diagram illustrating an example of a network architecture configuration of LTE.

First, a case where the communication system according to the present disclosure adopts LTE will be described. FIG. 20 is a diagram illustrating an example of a network architecture configuration of LTE. The network architecture illustrated in FIG. 20 includes the UE 1 and first and second core networks 20LA and 20LB. In FIG. 20, the UE 1 is connected with the first core network 20LA, but the UE 1 is also connectable with the second core network 20LB.

The first and second core networks 20LA and 20LB are connected to each other via a point of interface (POI) 2000L.

The core network 20L includes an eNB 3001, an MME 3002, a serving gateway (S-GW) 3003, a packet data network gateway (P-GW) 3004, and a home subscriber server (HSS) 3005.

The eNB 3001 functions as a base station of LTE. The MME 3002 is a control node which handles a signal of a control plane, and manages a moving state of a terminal device. The S-GW 3003 is a control node which handles a signal of a user plane, and is a gateway device which switches a transfer path of user data. The P-GW 3004 is a control node which handles the signal of the user plane, and is a gateway device serving as a connection point between the core network 20L and the PDN 3000. The HSS 3005 is a control node which handles subscriber data and performs service control. The management device 10 is a device which realizes the functions of the MME 3002. Further, the management device 10 may have a function as the S-GW 3003 or the P-GW 3004.

In FIG. 20, the interface provided for signal transmission in the core network 20L is indicated by a solid line. As illustrated in FIG. 20, the eNB 3001 is connected to the MME 3002 via an S1-MME interface, and is connected to the S-GW 3003 via an S1-U interface. The S-GW 3003 is connected to the MME 3002 via an S11 interface, and the MME 3002 is connected to the HSS 3005 via an S6a interface. The P-GW 3004 is connected to the S-GW 3003 via an S5/S8 interface.

As indicated by a dotted line in FIG. 20, in a case where there is, for example, a roaming agreement between the first and second MNOs, an interface for transmission of signals and data between the first and second core networks 20LA and 20LB is provided. In the example of FIG. 20, an MME 3002B is connected to a HSS 3005A via the S6a interface, and an S-GW 3003B is connected to a P-GW 3004A via the S8 interface. An MME 3002A is connected to a HSS 3005B via the S6a interface, and an S-GW 3003A is connected to a P-GW 3004B via the S8 interface.

(State Transition)

Subsequently, the state transition of the UE 1 (or the wireless communication device 100) in LTE will be described. First, the state transition managed by the core network 20 will be described, and then the state transition managed by the UE 1 will be described.

Figure 21:
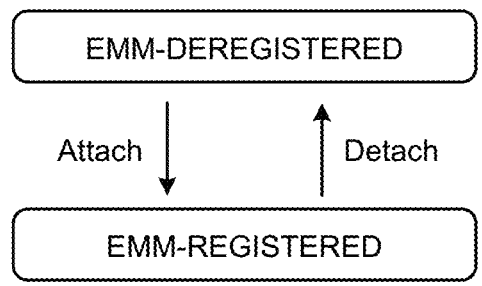
FIG. 21 is a diagram illustrating an example of a state transition of an EMM.

First, the state transition of the UE 1 managed by the state management unit 131 of the management device 10 will be described with reference to FIGS. 21 and 22. In the case of LTE, the management device 10 manages two state transitions of an EPS mobility management (EMM) and an EPS connection management (ECM).

(EMM State Transition 1)

First, the state transition of the EMM will be described with reference to FIG. 21. FIG. 21 is a diagram illustrating an example of the EMM state transition.

The state transition of the EMM depends on whether the UE 1 is registered in an EPC. When the power of the UE 1 is turned on, and the UE 1 is registered in the management device 10, the management device 10 causes the UE 1 to transition to EMM-REGISTERED. Incidentally, here, it is assumed that the management device 10 has the functions of the MME 3002 and the S-GW 3003, notifies the UE 1 of an IP address when receiving an Attach request from the UE 1, establishes a default EPS bearer, and registers the UE 1. Alternatively, the management device 10 may register the UE 1 in a case where the management device 10 has the function of the MME 3002, and transition the UE 1 to EMM-REGISTERED in a case where another device having the function of the S-GW 3003 registers the UE 1.

When the power of UE 1 is turned off or UE 1 is out of the range, the management device 10 deletes the registration of the UE 1 and transitions the state of the UE 1 to EMM-DEREGISTERED. When receiving a Detach request from the UE 1, the management device 10 transitions the state of the UE 1 to EMM-DEREGISTERED.

Incidentally, in a case where the state of the UE 1 is in EMM-DEREGISTERED, the UE 1 is not registered in the MME 3002 and the S-GW 3003, and the UE 1 is in a state with no IP address or default EPS bearer.

(ECM State Transition 1)

Figure 22:
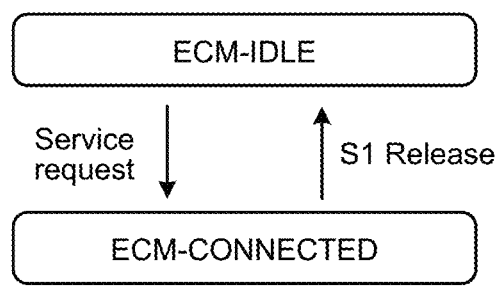
FIG. 22 is a diagram illustrating an example of a state transition of an ECM.

FIG. 22 is a diagram illustrating an example of the state transition of the ECM. The management device 10 manages two states of ECM-IDLE and ECM-CONNECTED (or also referred to as EMM-IDLE and EMM-CONNECTED). When receiving a Service request from the UE 1, the management device 10 transitions the state of the UE 1 from ECM-IDLE to ECM-CONNECTED. Further, when receiving an S1 Release from the UE 1, the management device 10 transitions the state of the UE 1 from ECM-CONNECTED to ECM-IDLE.

The state transition of the ECM depends on whether the UE 1 is in an active state or a standby state in terms of a non-access stratum (NAS) protocol and the EPC. That is, in a case where the UE 1 is in the active state, the management device 10 sets the UE 1 to ECM-CONNECTED. In this state, the management device 10 grasps the eNB/gNB to which the UE 1 belongs. Further, a signaling radio bearer is established with the UE 1, and the UE 1 can exchange control messages with the MME 3002. Further, a data bearer is established with the UE 1, and the UE 1 can exchange data with the S-GW 3003.

On the other hand, in a case where the UE 1 is in the standby state, the management device 10 sets the UE 1 to ECM-IDLE. In the case of ECM-IDLE, the network 20 releases the S1 Bearer and Radio Bearer of the UE 1, but the EPS Bearer is secured to secure logical connection.

Incidentally, in the case of ECM-IDLE, the management device 10 does not accurately grasp the position of the UE 1, and manages the position of the UE 1 within a range of a tracking area (TA). Therefore, when TA changes, the UE 1 executes TA Update. Further, the management device 10 transmits paging to the UE 1 in the TA unit to which the UE 1 belongs.

(RRC State Transition 1)

Figure 23:
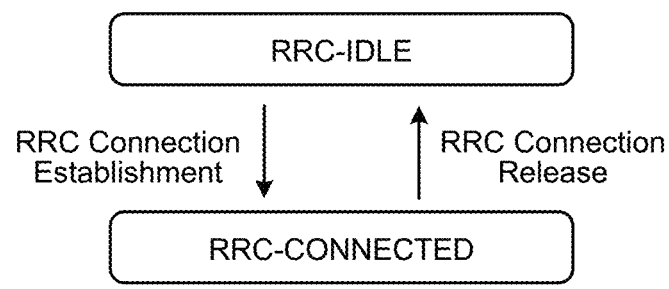
FIG. 23 is a diagram illustrating an example of a state transition of an RRC.

Incidentally, in LTE, for example, the eNB 3001 manages an RRC state transition. FIG. 23 is a diagram illustrating an example of the state transition of the RRC.

The state transition of the RRC depends on whether the UE 1 is in the active state or the standby state from the viewpoint of an access stratum (AS) protocol and an evolved universal terrestrial radio access network (E-UTRAN). That is, in a case where the UE 1 is in the active state, the eNB 3001 sets the UE 1 as RRC-CONNECTED. In this state, a serving eNB/en-gNB or a serving cell which performs communication is allocated to the UE 1. The UE 1 communicates with the allocated serving eNB/en-gNB by using a control message on a signaling radio bearer (SRB) 1.

On the other hand, in a case where the UE 1 is in the standby state, the eNB 3001 sets the UE 1 to RRC-IDLE. In this state, the radio access network (RAN) does not grasp the UE 1, and the serving eNB/en-gNB or the serving cell is not allocated. Further, the SRB 1 is released. In RRC-IDLE, the UE 1 starts some limited communications (for example, the reception of system information). For example, when receiving a paging request from the EPC, the RAN is connected to the UE 1 by using the RRC paging message.

Further, in a case where the UE 1 is connected to the RAN or a case where the UE 1 responds to the paging message, the UE 1 executes the RRC connection establishment process (for example, a random access procedure and an RRC (Connection) setup procedure). In response to such a process, when the RAN accepts the establishment of the RRC connection, the eNB 3001 causes the state of the UE 1 to transition to RRC-CONNECTED.

Incidentally, except for a transient state, the UE 1 in the standby state is always managed as ECM-IDLE and RRC-IDLE, and the UE 1 in the active state is always managed as ECM-CONNECTED and RRC-CONNECTED.

(EMM State Transition 2)

Figure 24:
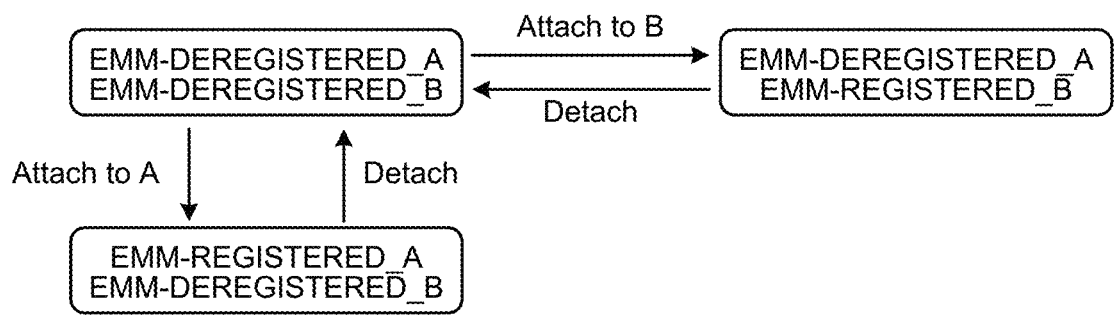
FIG. 24 is a diagram illustrating an example of the state transition of the EMM in the wireless communication device.

Subsequently, the state transition of the EMM in the wireless communication device 100 will be described. FIG. 24 is a diagram illustrating an example of the state transition of the EMM in the wireless communication device 100. The state management unit 149 of the wireless communication device 100 manages, as the state of the UE 1, the registration state (EMM-REGISTERED) registered in the management device 10 and the non-registration state (EMM-DEREGISTERED) not registered for each PLMN.

In the case of being not registered in either of the first and second management devices 10A and 10B, for example, when the power is turned on, the wireless communication device 100 manages both the first and second PLMNs as the non-registration state (EMM-DEREGISTERED_A, EMM-DEREGISTERED_B).

Here, it is assumed that the registration processing unit 147 of the wireless communication device 100 performs first or second attach process on the first management device 10A. In this case, the wireless communication device 100 manages the first PLMN as the registration state (EMM-REGISTERED_A) and the second PLMN as the non-registration state (EMM-DEREGISTERED_B). Incidentally, the first and second attach processes here are processes for requesting registration to the management device 10, and are processes corresponding to the first and second registration processes in NR described above.

On the other hand, it is assumed that the deregistration processing unit 148 of the wireless communication device 100 requests the first management device 10A to delete (detach) the registration of the UE 1 in the "EMM-REGISTERED_A, EMM-DEREGISTERED_B" state. In this case, the wireless communication device 100 manages both the first and second PLMNs as the non-registration state "EMM-DEREGISTERED_A, EMM-DEREGISTERED_B".

It is assumed that the switching control unit 141 of the wireless communication device 100 selects to perform the first or second attach processes on the second management device 10B with both the first and second PLMNs in the non-registration state (EMM-DEREGISTERED_A, EMM-DEREGISTERED_B). In this case, the wireless communication device 100 causes the first PLMN to transition to the non-registration state (EMM-DEREGISTERED_A) and the second PLMN to transition to the registration state (EMM-REGISTERED_B).

In a case where the second management device 10B is requested to delete the registration of the UE 1 in the "EMM-DEREGISTERED_A, EMM-REGISTERED_B" state, the wireless communication device 100 causes both the first and second PLMNs to transition to the non-registration state (EMM-DEREGISTERED_A, EMM-DEREGISTERED_B).

(ECM State Transition 2)

Figure 25:
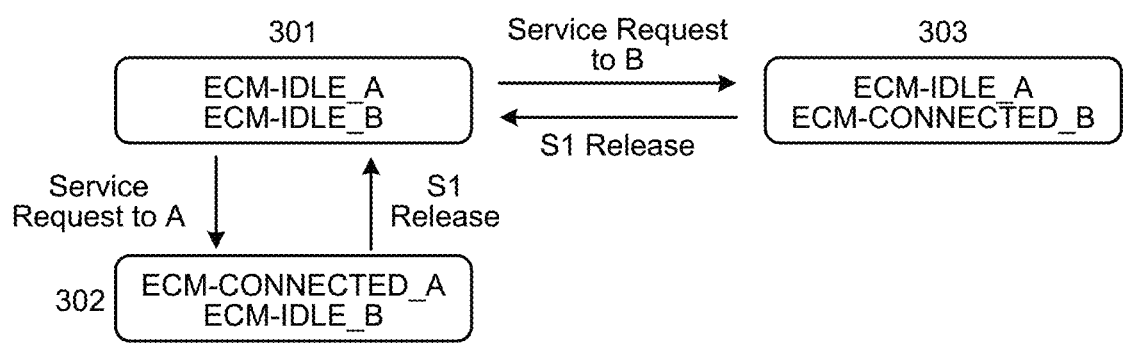
FIG. 25 is a diagram illustrating an example of the state transition of the ECM in the wireless communication device.

Subsequently, the state transition of the ECM in the wireless communication device 100 will be described. FIG. 25 is a diagram illustrating an example of the state transition of the ECM in the wireless communication device 100. The state management unit 149 of the wireless communication device 100 manages ECM-CONNECTED and ECM-IDLE as the active/standby state of the UE 1 for each PLMN.

In a case where both the first and second PLMNs are in ECM-IDLE (ECM-IDLE_A, ECM-IDLE_B), the wireless communication device 100 performs a service request process on the first core network 20A, and causes the first PLMN to transition to ECM-CONNECTED_A and the second PLMN to transition to ECM-IDLE_B.

On the other hand, when the S1 release process is performed on the first core network 20A in the "ECM-CONNECTED_A, ECM-IDLE_B" state, the wireless communication device 100 causes both the first and second PLMNs to transition to ECM-IDLE (ECM-IDLE_A, ECM-IDLE_B).

When performing the service request process on the second core network 20B with both the first and second PLMNs in the ECM-IDLE (ECM-IDLE_A, ECM-IDLE_B) state, the wireless communication device 100 causes the first PLMN to transition to ECM-IDLE_A and the second PLMN to transition to ECM-CONNECTED_B.

When performing the S1 release process on the second core network 20B in the "ECM-IDLE_A, ECM-CONNECTED_B" state, the wireless communication device 100 causes both the first and second PLMNs to transition to ECM-IDLE (ECM-IDLE_A, ECM-IDLE_B).

(RRC State Transition 2)

Figure 26:
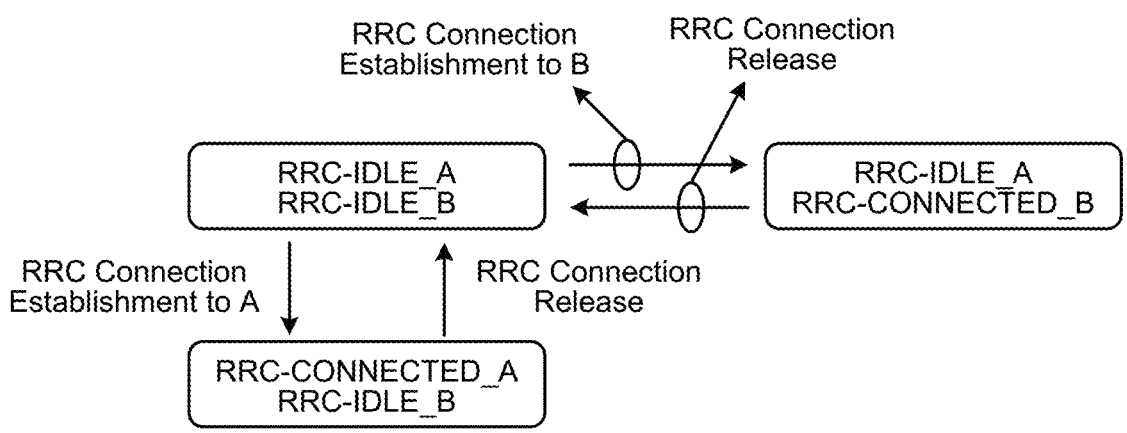
FIG. 26 is a diagram illustrating an example of the state transition of the RRC in the wireless communication device.

Subsequently, the state transition of the RRC in the wireless communication device 100 will be described. FIG. 26 is a diagram illustrating an example of the state transition of the RRC in the wireless communication device 100. The state management unit 149 of the wireless communication device 100 manages RRC-CONNECTED and RRC-IDLE as the active/standby state of the UE 1 for each PLMN.

In a case where both the first and second PLMNs are in RRC-IDLE (RRC-IDLE_A, RRC-IDLE_B), the wireless communication device 100 performs the RRC connection establishment process with the RAN connected to the first core network 20A, and causes the first PLMN to transition to RRC-CONNECTED_A (maintains the state of RRC-IDLE_B for the second PLMN).

On the other hand, when the RRC connection release process is performed with the RAN connected to the first core network 20A in the "RRC-CONNECTED_A, RRC-IDLE_B" state, the wireless communication device 100 causes the first PLMN to transition to RRC-IDLE (RRC-IDLE_A) (maintains the state of RRC-IDLE_B for the second PLMN).

When the RRC connection establishment process is performed with the RAN connected to the second core network 20B with both the first and second PLMNs in the state of RRC-IDLE (RRC-IDLE_A, RRC-IDLE_B), the wireless communication device 100 causes the first PLMN to transition to RRC-IDLE_A and the second PLMN to transition to RRC-CONNECTED_B.

When the RRC connection release process is performed with the RAN connected to the second core network 20B in the "RRC-IDLE_A, RRC-CONNECTED_B" state, the wireless communication device 100 causes both the first and second PLMNs to transition to RRC-IDLE (RRC-IDLE_A, RRC-IDLE_B).

(Registration Process)

Figure 27:
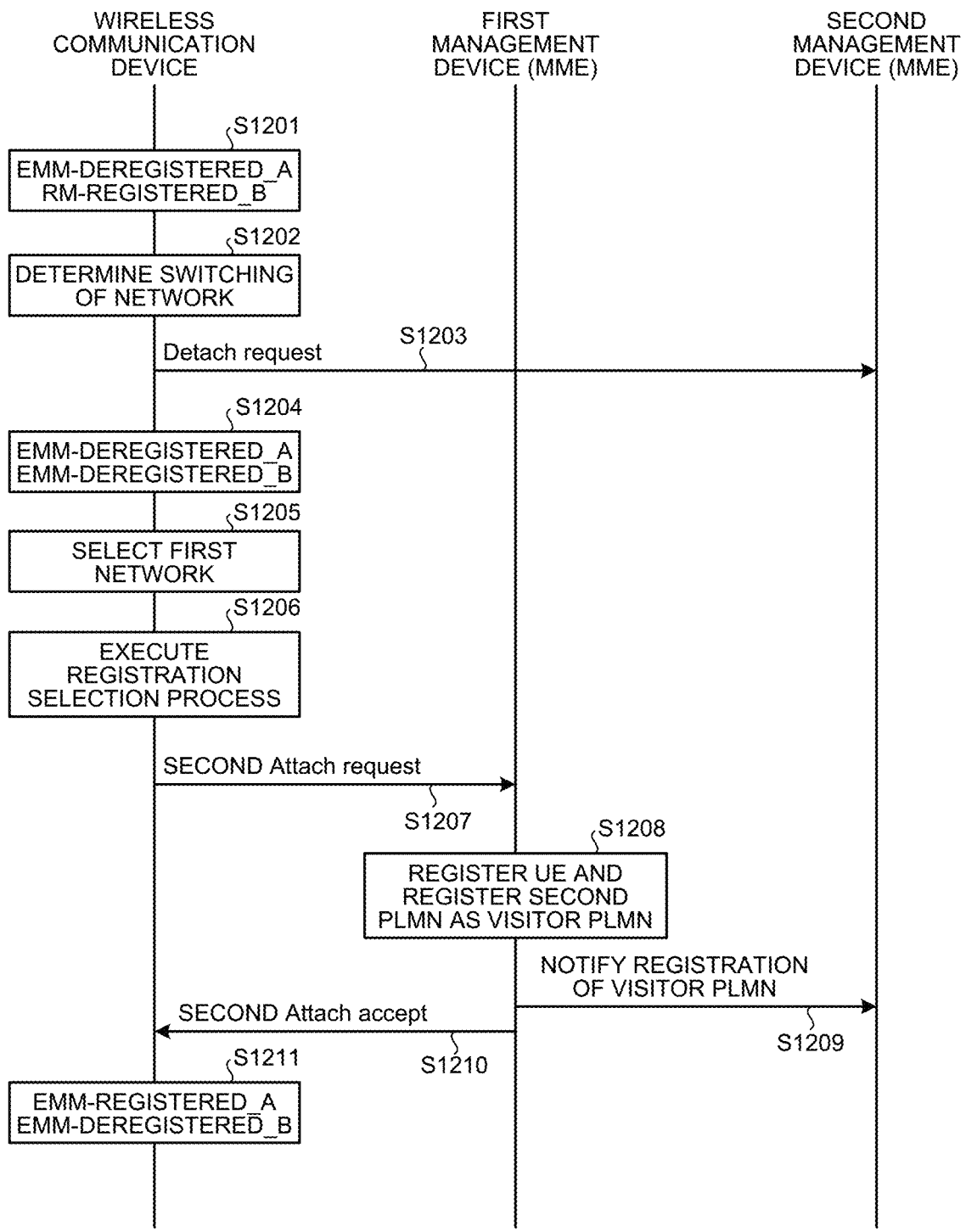
FIG. 27 is a diagram illustrating an example of the registration process in LTE.

Subsequently, the registration process performed by the wireless communication device 100 in a case where the management device 10 functions as the MME 3002 of LTE will be described. Here, a case where the wireless communication device 100 performs the second registration process will be described as an example. FIG. 27 is a diagram illustrating an example of the registration process in LTE.

The wireless communication device 100 performs management in a state where the UE 1 is not registered in the first management device 10A (EMM-DEREGISTERED_A), and the UE 1 is registered in the second management device 10B (EMM-REGISTERED_B) (step S1201). In this state, when there is an instruction from the upper layer, the wireless communication device 100 determines the switching of the network (including the network 20L), that is, the switching of the PLMN to be registered (step S1202).

The wireless communication device 100 transmits a Detach (registration deletion) request to the second management device 10B in which the UE 1 is registered (step S1203). The wireless communication device 100 causes both the first and second PLMNs to transition to the non-registration (EMM-DEREGISTERED_A, EMM-DEREGISTERED_B) state (step S1204).

The wireless communication device 100 selects the first network 20A as the network 20 to be switched (step S1205). In other words, the wireless communication device 100 selects the first PLMN as the PLMN to be registered, and executes the registration selection process (step S1206).

Here, the registration selection process is the same as the process illustrated in FIG. 14 except that the IMSI request is transmitted instead of the SUPI request when the second PLMN ID is acquired, and thus description thereof is omitted. The wireless communication device 100 which selects the second registration process in the registration selection process executes the following second registration process.

First, the wireless communication device 100 transmits a second Attach request to the first management device 10A (step S1207). The second Attach request includes the second PLMN ID.

Here, when the GUTI allocated from the first PLMN to which the first management device 10A belongs is available, the wireless communication device 100 transmits the second Attach request with the GUTI included therein. On the other hand, in a case where the allocated GUTI is not available, the wireless communication device 100 transmits the second Attach request with the GUTI allocated from another PLMN (for example, the second PLMN to which the second management device 10B belongs), included therein.

Incidentally, in a case where the wireless communication device 100 does not have the available GUTI, the wireless communication device 100 transmits the second Attach request with the IMSI stored in the first SIM 30A included therein.

The wireless communication device 100 may transmit, to the first management device 10A, the second Attach request with the paging priority included therein.

The first management device 10A which receives the second Attach request registers the UE 1 and registers the second PLMN as the visitor PLMN (step S1208).

Here, in the case of not acquiring a permanent equipment identifier (PEI) which is identification information (UE identity) of the UE 1, the first management device 10A transmits an identity request to the wireless communication device 100 to acquire the PEI of the UE 1. Incidentally, the first management device 10A may acquire the IMSI instead of the PEI.

The first management device 10A notifies the second management device 10B belonging to the second PLMN that the second PLMN is registered as the visitor PLMN (step S1209). Further, the first management device 10A transmits a second Attach accept to the wireless communication device 100 to notify that the registration of the UE 1 is completed (step S1210).

The wireless communication device 100 transitions the first PLMN to the registration state (EMM-REGISTERED_A) and the second PLMN to the non-registration (EMM-DEREGISTERED_B) state (step S1211), and ends the second registration process. Here, the wireless communication device 100 may receive a notification indicating that the second PLMN is registered as the visitor PLMN via the second Attach accept message, and transition the first PLMN to the home PLMN registration state (EMM-REGISTERED_A) and the second PLMN to the visitor PLMN registration state (EMM-REGISTERED_R_B). Accordingly, the wireless communication device 100 monitors the first paging addressed to the IMSI stored in the first SIM 30A and the second paging addressed to the IMSI stored in the second SIM 30B for the network of the first PLMN to which the first management device 10A belongs.

<5.1.2. Application Example in Case where LTE and NR are Mixed>

Next, a case where the first network 20LA adopts LTE, and the second network 20B adopts NR will be described. In this case, for example, it is assumed that the MME 3002A belonging to the first network 20LA and an AMF 1290B belonging to the second network 20B are connected to each other on the basis of the roaming agreement.

In this case, the first management device 10A functions as the MME 3002A, and the second management device 10B functions as the AMF 1290B. Further, the wireless communication device 100 manages the state transition of the EMM, the ECM, and the RCC for the first PLMN, and manages the state transition of the RM for the second PLMN.

Figure 28:
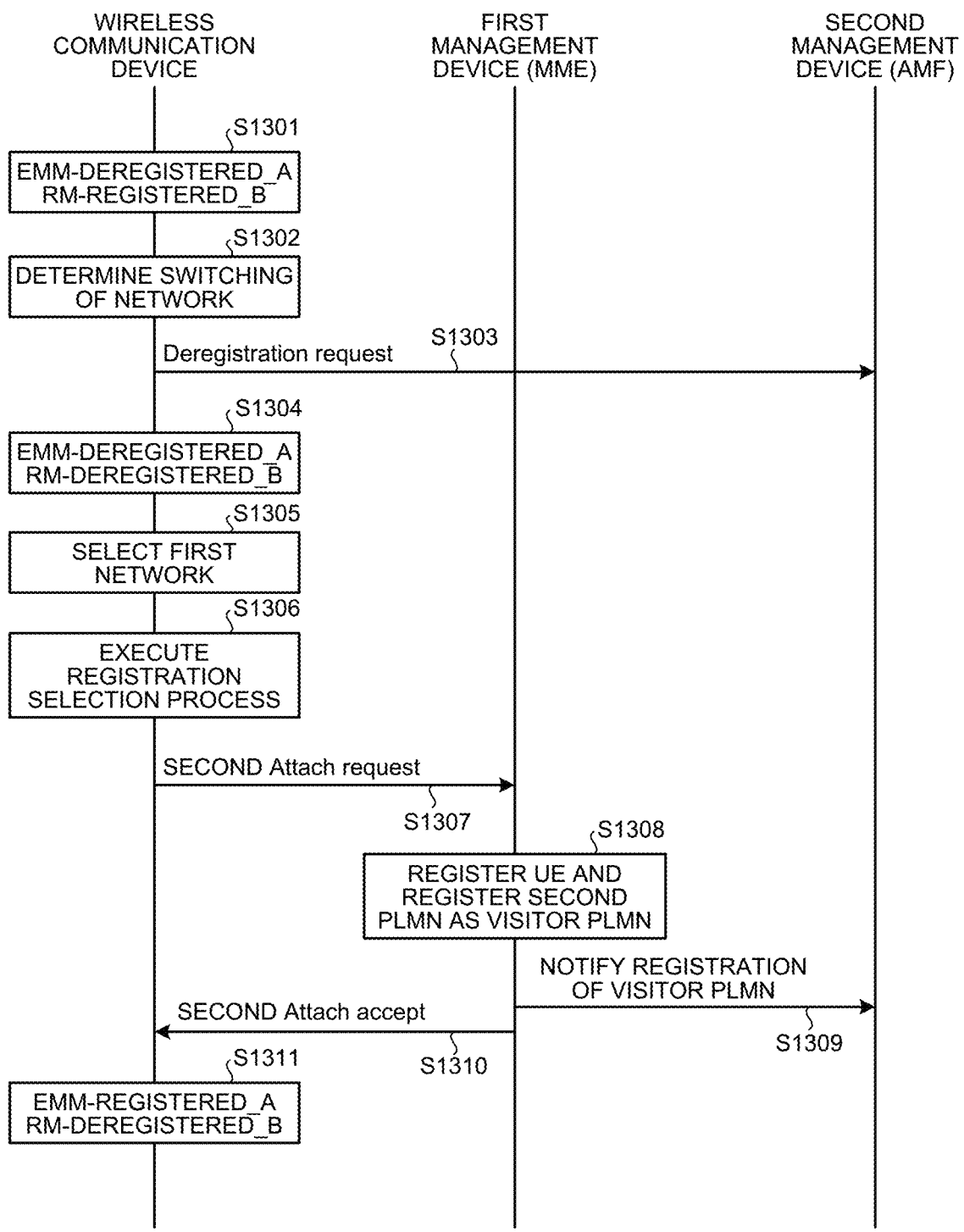
FIG. 28 is a diagram illustrating an example of the registration process in a case where LTE and NR are mixed.

FIG. 28 is a diagram illustrating an example of the registration process in a case where LTE and NR are mixed. In FIG. 28, it is assumed that the wireless communication device 100 selects switching from the second network 20B to the first network 20LA and performs the second registration process.

The wireless communication device 100 performs management in a state where the UE 1 is not registered in the first management device 10A (EMM-DEREGISTERED_A), and the UE 1 is registered in the second management device 10B (RM-REGISTERED_B) (step S1301). In this state, when there is an instruction from the upper layer, the wireless communication device 100 determines the switching of the network 20, that is, the switching of the PLMN to be registered (step S1302).

The wireless communication device 100 transmits a Deregistration request to the second management device 10B (step S1303). The wireless communication device 100 causes both the first and second PLMNs to transition to the non-registration (EMM-DEREGISTERED_A, RM-DEREGISTERED_B) state (step S1304).

The wireless communication device 100 selects the first network 20LA as the network 20 to be switched (step S1305). In other words, the wireless communication device 100 selects the first PLMN as the PLMN to be registered, and executes the registration selection process (step S1306).

Here, it is assumed that the wireless communication device 100 selects the second registration process in the registration selection process.

In this case, the wireless communication device 100 transmits a second Attach request to the first management device 10A (step S1307). The second Attach request includes the second PLMN ID.

The first management device 10A which receives the second Attach request registers the UE 1 and registers the second PLMN as the visitor PLMN (step S1308).

The first management device 10A notifies the second management device 10B belonging to the second PLMN that the second PLMN is registered as the visitor PLMN (step S1309). Further, the first management device 10A transmits a second Attach accept to the wireless communication device 100 to notify that the registration of the UE 1 is completed (step S1310).

The wireless communication device 100 transitions the first PLMN to the registration state (EMM-REGISTERED_A) and the second PLMN to the non-registration (RM-DEREGISTERED_B) state (step S1311), and ends the second registration process. Here, the wireless communication device 100 may receive a notification indicating that the second PLMN is registered as the visitor PLMN via the second Attach accept message, and transition the first PLMN to the home PLMN registration state (EMM-REGISTERED_A) and the second PLMN to the visitor PLMN registration state (RM-REGISTERED_R_B). Accordingly, the wireless communication device 100 monitors the first paging addressed to the IMSI stored in the first SIM 30A and the second paging addressed to the SUPI stored in the second SIM 30B for the network of the first PLMN to which the first management device 10A belongs.

As described above, even in a case where different radio access technologies such as LTE and NR are mixed, the wireless communication device 100 can switch between two SIMs to perform communication.

<5.2. Application Example Regarding Wireless Communication Device>

First Application Example

Figure 29:
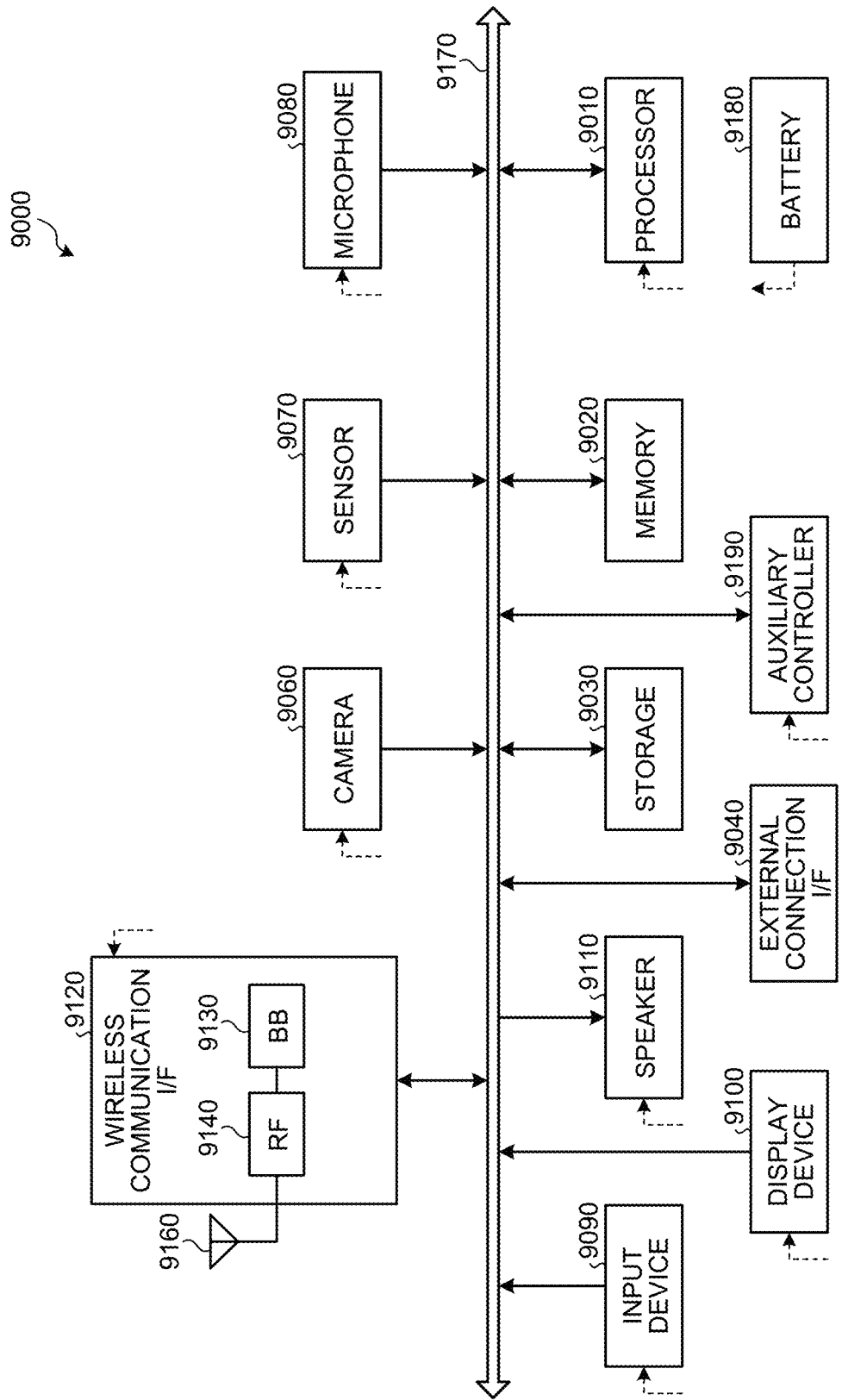
FIG. 29 is a block diagram illustrating an example of a schematic configuration of a smartphone to which a technology according to the present disclosure can be applied.

FIG. 29 is a block diagram illustrating an example of a schematic configuration of a smartphone 9000 to which the technology according to the present disclosure can be applied. The smartphone 9000 includes a processor 9010, a memory 9020, a storage 9030, an external connection interface 9040, a camera 9060, a sensor 9070, a microphone 9080, an input device 9090, a display device 9100, a speaker 9110, a wireless communication interface 9120, an antenna 9160, a bus 9170, a battery 9180, and an auxiliary controller 9190.

The processor 9010 may be, for example, a CPU or a system on chip (SoC), and controls the functions of an application layer and other layers of the smartphone 9000. The memory 9020 includes a RAM and a ROM, and stores a program executed by the processor 9010 and data. The storage 9030 may include a storage medium such as a semiconductor memory and a hard disk. The external connection interface 9040 is an interface for connecting an externally attached device such as memory cards and universal serial bus (USB) devices to the smartphone 9000.

The camera 9060 includes, for example, an image sensor such as charge coupled devices (CCDs) and complementary metal oxide semiconductor (CMOS), and generates a captured image. The sensor 9070 may include a sensor group including, for example, a positioning sensor, a gyro sensor, a geomagnetic sensor, an acceleration sensor, and the like. The microphone 9080 converts a sound that is input into the smartphone 9000 to an audio signal. The input device 9090 includes, for example, a touch sensor which detects that a screen of the display device 9100 is touched, a key pad, a keyboard, a button, a switch, or the like, and accepts an operation or an information input from a user. The display device 9100 includes a screen such as liquid crystal displays (LCDs) and organic light emitting diode (OLED) displays, and displays an output image of the smartphone 9000. The speaker 9110 converts the audio signal that is output from the smartphone 9000 to a sound.

The wireless communication interface 9120 supports a cellular communication system such as NR or LTE and executes wireless communication. The wireless communication interface 9120 may typically include a BB processor 9130, an RF circuit 9140, and the like. The BB processor 9130 may, for example, perform encoding/decoding, modulation/demodulation, multiplexing/demultiplexing, and the like, and executes a variety of types of signal processing for wireless communication. On the other hand, the RF circuit 9140 may include a mixer, a filter, an amplifier, and the like, and transmits and receives a wireless signal via the antenna 9160. The wireless communication interface 9120 may be a one-chip module in which the BB processor 9130 and the RF circuit 9140 are integrated.

The wireless communication interface 9120 may support other types of wireless communication system such as a short range wireless communication system, a near field communication system, and a wireless local area network (LAN) system in addition to the cellular communication system, and in this case, the wireless communication interface 9120 may include the BB processor 9130 and the RF circuit 9140 for each wireless communication system. Here, the short range wireless communication system may include device to device (D2D) communication called sidelink.

The antenna 9160 includes one or more antenna elements (for example, a plurality of antenna elements configuring a MIMO antenna) and is used for transmission and reception of the wireless signal by the wireless communication interface 9120.

The bus 9170 connects the processor 9010, the memory 9020, the storage 9030, the external connection interface 9040, the camera 9060, the sensor 9070, the microphone 9080, the input device 9090, the display device 9100, the speaker 9110, the wireless communication interface 9120, and the auxiliary controller 9190 to each other. The battery 9180 supplies electric power to each block of the smartphone 9000 illustrated in FIG. 29 via a feeder line that is partially indicated by a broken line in the drawing. The auxiliary controller 9190, for example, operates a minimally necessary function of the smartphone 9000 in a sleep mode.

In the smartphone 9000 illustrated in FIG. 29, one or more components included in the control unit 140 described with reference to FIG. 7 may be implemented in the wireless communication interface 9120. Alternatively, at least some of these components may be implemented in the processor 9010 or the auxiliary controller 9190. As an example, the smartphone 9000 may be mounted with a module including a part (for example, the BB processor 9130) or all of the wireless communication interface 9120, the processor 9010, and/or the auxiliary controller 9190, and the module may be implemented with one or more of the components. In this case, the module may store a program for causing the processor to function as the one or more components (in other words, a program for causing the processor to execute the operations of the one or more components) and execute the program. As another example, a program for causing the processor to function as the one or more components may be installed in the smartphone 9000, and the wireless communication interface 9120 (for example, the BB processor 9130), the processor 9010, and/or the auxiliary controller 9190 may execute the program. As described above, the smartphone 9000 or the module may be provided as a device including the one or more components, and a program for causing the processor to function as the one or more components may be provided. Further, a readable recording medium on which the above-described program is recorded may be provided.

In the smartphone 9000 illustrated in FIG. 29, for example, the communication unit 120 described with reference to FIG. 7 may be implemented in the wireless communication interface 9120 (for example, the RF circuit 9140). Further, the antenna unit 110 may be implemented in the antenna 9160. Further, the storage unit 130 may be implemented in the memory 9020.

Second Application Example

FIG. 30 is a block diagram illustrating an example of a schematic configuration of a car navigation device 9200 to which the technology according to the present disclosure can be applied. The car navigation device 9200 includes a processor 9210, a memory 9220, a global positioning system (GPS) module 9240, a sensor 9250, a data interface 9260, a content player 9270, a storage medium interface 9280, an input device 9290, a display device 9300, a speaker 9310, a wireless communication interface 9330, an antenna 9370, and a battery 9380.

The processor 9210 may be, for example, a CPU or an SoC, and controls the navigation function and the other functions of the car navigation device 9200. The memory 9220 includes a RAM and a ROM, and stores a program executed by the processor 9210 and data.

The GPS module 9240 uses a GPS signal received from a GPS satellite to measure the position (for example, latitude, longitude, and altitude) of the car navigation device 9200. The sensor 9250 may include a sensor group including, for example, a gyro sensor, a geomagnetic sensor, and a barometric sensor. The data interface 9260 is, for example, connected to an in-vehicle network 9410 via a terminal that is not illustrated, and acquires data such as vehicle speed data generated on the vehicle side.

The content player 9270 reproduces content stored in a storage medium (for example, CD or DVD) inserted into the storage medium interface 9280. The input device 9290 includes, for example, a touch sensor which detects that a screen of the display device 9300 is touched, a button, a switch, or the like, and accepts operation or information input from a user. The display device 9300 includes a screen such as LCDs and OLED displays, and displays an image of the navigation function or the reproduced content. The speaker 9310 outputs a sound of the navigation function or the reproduced content.

The wireless communication interface 9330 supports a cellular communication system such as NR or LTE and executes wireless communication. The wireless communication interface 9330 may typically include a BB processor 9340, an RF circuit 9350, and the like. The BB processor 9340 may, for example, perform encoding/decoding, modulation/demodulation, multiplexing/demultiplexing, and the like, and executes a variety of types of signal processing for wireless communication. On the other hand, the RF circuit 9350 may include a mixer, a filter, an amplifier, and the like, and transmits and receives a wireless signal via the antenna 9370. The wireless communication interface 9330 may be a one-chip module in which the BB processor 9340 and the RF circuit 9350 are integrated.

The wireless communication interface 9330 may support other types of wireless communication system such as a short range wireless communication system, a near field communication system, and a wireless LAN system in addition to the cellular communication system, and in this case, the wireless communication interface 9330 may include the BB processor 9340 and the RF circuit 9350 for each wireless communication system. Here, the short range wireless communication system may include device to device (D2D) communication called sidelink.

The antenna 9370 includes one or more antenna elements (for example, a plurality of antenna elements configuring a MIMO antenna) and is used for transmission and reception of the wireless signal by the wireless communication interface 9330.

The battery 9380 supplies electric power to each block of the car navigation device 9200 illustrated in FIG. 30 via a feeder line that is partially indicated by a broken line in the drawing. Further, the battery 9380 accumulates the electric power supplied from the vehicle.

In the car navigation device 9200 illustrated in FIG. 30, one or more components included in the control unit 140 described with reference to FIG. 7 may be implemented in the wireless communication interface 9330. Alternatively, at least some of these components may be implemented in the processor 9210. As an example, the car navigation device 9200 may be mounted with a module including a part (for example, the BB processor 9340) or all of the wireless communication interface 9330 and/or the processor 9210, and the module may be implemented with one or more of the components. In this case, the module may store a program for causing the processor to function as the one or more components (in other words, a program for causing the processor to execute the operations of the one or more components) and execute the program. As another example, a program for causing the processor to function as the one or more components may be installed in the car navigation device 9200, and the wireless communication interface 9330 (for example, the BB processor 9340) and/or the processor 9210 may execute the program. As described above, the car navigation device 9200 or the module may be provided as a device including the one or more components, and a program for causing the processor to function as the one or more components may be provided. Further, a readable recording medium on which the above-described program is recorded may be provided.

In the car navigation device 9200 illustrated in FIG. 30, for example, the communication unit 120 described with reference to FIG. 7 may be implemented in the wireless communication interface 9330 (for example, the RF circuit 9350). Further, the antenna unit 110 may be implemented in the antenna 9370. Further, the storage unit 130 may be implemented in the memory 9220.

The technology of the present disclosure may also be realized as an in-vehicle system (or a vehicle) 9400 including one or more blocks of the above-described car navigation device 9200, the in-vehicle network 9410, and a vehicle module 9420. The vehicle module 9420 generates vehicle data such as vehicle speed, engine speed, and trouble information, and outputs the generated data to the in-vehicle network 9410.

<5.3. Other Application Examples>

In the embodiment described above, the wireless communication device 100 performs communication with switching between the first and second networks 20A and 20B operated by the first and second MNOs, but the present invention is not limited thereto. One of the networks in which the wireless communication device 100 performs communication may be, for example, a network managed and operated by a service provider other than the MNO. Examples of the network include a private network, a non-public network, and a neutral host network. Further, examples of the service provider which operates such a network include an owner of a factory, a hospital which uses an operating room, and a retailer which operates a store.

In the embodiment described above, the first and second subscriber modules are the SIM 30 mounted on the UE 1. However, the SIM 30 may be any module which can identify the subscriber of the service provided by the MNO, and may be, for example, a universal subscriber identity module (USIM) used in LTE or a next generation (NextGen) USIM for 5G.

The SIM 30 is not limited to a removable SIM card, and may be, for example, an embedded SIM (eSIM) or an integrated SIM configured inside the SoC. Further, the eSIM and the integrated SIM may be downloadable SIMs in which held contents can be written or updated via an external device or a wired or wireless network. The downloadable SIM may be called, for example, a software SIM or a software SIM.

<6. Modification>

The control device which controls the management device 10 and the wireless communication device 100 of this embodiment may be realized by a dedicated computer system or may be realized by a general-purpose computer system.

For example, a program for executing the above-described operation is stored and distributed in a computer-readable recording medium such as an optical disk, a semiconductor memory, a magnetic tape, a flexible disk, or a hard disk. Then, for example, the control device is configured by installing the program in a computer and executing the above-described processing. At this time, the control device may be an external device (for example, a personal computer) of the management device 10 or the wireless communication device 100. Further, the control device may be the management device 10 or an internal device (for example, the control unit 13 or the control unit 140) of the wireless communication device 100.

The communication program may be stored in a disk device included in a server device on a network such as the Internet so as to be downloaded to a computer, or the like. Further, the above-described functions may be realized by cooperation between an operating system (OS) and application software. In this case, a part other than the OS may be stored and distributed in a medium, and the part other than the OS may be stored in the server device, so as to be downloaded to a computer, or the like.

Among the processing described in the above embodiment, all or part of the processing described as being automatically performed may be manually performed, or all or part of the processing described as being manually performed may be automatically performed by a known method. In addition, the processing procedures, specific names, information including various data and parameters described in the above-described specification and drawings may be arbitrarily changed unless otherwise specified. For example, the various types of information illustrated in each drawing are not limited to the illustrated information.

Each component of each device illustrated in the drawings is functionally conceptual, and does not necessarily have to be physically configured as illustrated. That is, the specific form of distribution and integration of each device is not limited to the illustrated one, and all or part of the device may be configured to be functionally or physically distributed and integrated in arbitrary units according to various loads, use conditions, and the like.

The above-described embodiment can be appropriately combined in an area in which the processing contents do not contradict each other.

<7. Conclusion>

As described above, according to an embodiment of the present disclosure, a wireless communication device (for example, the wireless communication device 100) includes a control unit (for example, the control unit 140). The control unit (control unit 140) acquires a first PLMN list (for example, the first PLMN list 40) on the basis of information stored in a first subscriber identity module (for example, the first SIM 30A). The control unit (control unit 140) selects a home PLMN from the first PLMN list (first PLMN list 40). The control unit (control unit 140) acquires a second PLMN ID on the basis of information stored in a second subscriber identity module (for example, the second SIM 30B). In a case where the second PLMN ID is not included in the first PLMN list (first PLMN list 40), the control unit (control unit 140) performs a first registration request (for example, the Registration request) to a first management device (for example, the first management device 10A) which belongs to the home PLMN and manages registration of the wireless communication device (wireless communication device 100). In a case where the second PLMN ID is included in the first PLMN list (first PLMN list 40), the control unit (control unit 140) performs, to the first management device (first management device 10A), a second registration request (for example, the second Registration request) with information regarding a second PLMN included therein. Accordingly, the first management device can manage the second PLMN as a visitor PLMN in a case where the second PLMN ID is included in the first PLMN list. In this case, the wireless communication device may receive paging not only from the first PLMN but also from the second PLMN in the case of being registered in the first management device.

Although each of the embodiments of the present disclosure has been described above, the technical scope of the present disclosure is not limited to each of the above-described embodiments as it is, and various modifications may be made without departing from the gist of the present disclosure. Further, the components may be combined suitably over different embodiments and the modification.

The effects in each embodiment described in this specification are merely examples and are not limited, and other effects may be present.

Incidentally, this technology may also be configured as below.

(1)

A wireless communication device comprising:
a control unit that acquires a first PLMN list on a basis of information stored in a first subscriber identity module,
selects a home PLMN from the first PLMN list,
acquires a second PLMN ID on a basis of information stored in a second subscriber identity module,
perform a first registration request to a first management device which belongs to the home PLMN and manages registration of the wireless communication device in a case where the second PLMN ID is not included in the first PLMN list, and
performs, to the first management device, a second registration request with information regarding the second PLMN included in the second registration request in a case where the second PLMN ID is included in the first PLMN list.

(2)

The wireless communication device according to (1), wherein
the control unit acquires an EHPLMN list and a forbidden PLMN list from the first subscriber identity module, and
sets a list obtained by removing the forbidden PLMN list from the EHPLMN list as the first PLMN list.

(3)

The wireless communication device according to (1) or (2), wherein
the control unit performs a registration deletion request to a second management device which belongs to the second PLMN and manages registration of the wireless communication device, and then performs the first or second registration request to the first management device.

(4)

The wireless communication device according to (3), wherein
the control unit performs the first or second registration request to the first management device in a case where switching from the second management device to the first management device is determined.

(5)
The wireless communication device according to (3) or (4), wherein
the control unit performs the first or second registration request to the first management device in a case where a switching instruction to the first management device from the second management device is received.

(6)
The wireless communication device according to (5), wherein
the switching instruction includes a timer period, and
the control unit requests the first management device to perform registration during the timer period.

(7)
The wireless communication device according to (6), wherein
in a case of requesting the first management device to perform registration during the timer period, the control unit transmits a registration request signal including a registration period in which the registration is performed.

(8)
The wireless communication device according to (6) or (7), wherein
the control unit requests registration in the first management device without requesting deletion of registration in the second management device during the timer period.

(9)
The wireless communication device according to (8), in which
the control unit manages a registration/non-registration state in the first and second management devices, and
in a case where the timer period or the registration period ends, causes a registration state in the first management device to transition to a non-registration state.

(10)
A communication control method comprising:
acquiring a first PLMN list on a basis of information stored in a first subscriber identity module;
selecting a home PLMN from the first PLMN list;
acquiring a second PLMN ID on a basis of information stored in a second subscriber identity module;
performing a first registration request to a first management device which belongs to the home PLMN and manages mobility in a case where the second PLMN ID is not included in the first PLMN list, and
performing, to the first management device, a second registration request with information regarding the second PLMN included in the second registration request in a case where the second PLMN ID is included in the first PLMN list.

(11)
A management device which belongs to a first PLMN and manages registration of a wireless communication device, the device including:
a control unit that receives a registration request including a second PLMN ID from the wireless communication device,
registers the wireless communication device according to the registration request, and
notifies a second management device belonging to the second PLMN of the registration of the wireless communication device.

(12)
The management device according to (11), in which
the control unit receives a notification regarding paging addressed to the wireless communication device from the second PLMN via the second management device.

(13)
The management device according to (12), in which
the control unit transmits a switching instruction for switching a registration destination from the first PLMN to the second PLMN to the wireless communication device in a case of receiving the notification regarding the paging.

(14)
The management device according to (13), in which
the switching instruction includes a timer period, and the control unit transmits paging from the first PLMN after waiting for an end of the timer period.

(15)
The management device according to (14), in which
the notification regarding the paging includes information regarding a size of data to be transmitted by paging, and
the control unit transmits the switching instruction including the timer period in a case where the size is equal to or less than a threshold.

(16)
The management device according to (12), in which
the control unit transmits paging from the second PLMN to the wireless communication device according to the received notification regarding the paging.

(17)
The management device according to (16), in which
the registration request includes a paging priority of the first PLMN or the second PLMN, and
the control unit transmits paging from the first or second PLMN according to the paging priority in a case of receiving paging from the first PLMN and the notification regarding the paging from the second PLMN via the second management device.

(18)
A management device which belongs to a second PLMN, the device including:
a control unit that receives a notification regarding registration of a wireless communication device from a first management device belonging to a first PLMN, and
transmits a notification regarding paging to the first management device in a case where a paging request addressed to the wireless communication device is received from the second PLMN.

(19)
The management device according to (18), in which
the notification regarding the paging is a paging request addressed to the wireless communication device.

(20)
The management device according to (19), in which
the notification regarding the paging is a switching request for switching a registration destination of the wireless communication device from the first PLMN to the second PLMN.

(21)
The management device according to any one of (18) to (20), in which
the notification regarding the paging includes information regarding a size of data to be transmitted by the paging.

(22)
The management device according to (21), in which
the control unit registers the wireless communication device in a case where a registration request is received from the wireless communication device after transmission of the switching request.

(23)

The management device according to (22), in which the registration request includes a registration period, and the control unit manages the wireless communication device as a registration state during the registration period, and manages the wireless communication device to transition from the registration state to a non-registration state when the registration period ends.

(24)

A management method by a management device which belongs to a first PLMN and manages registration of a wireless communication device, the method including:

receiving a registration request including a second PLMN ID from the wireless communication device;

registering the wireless communication device according to the registration request; and notifying a second management device belonging to the second PLMN of the registration of the wireless communication device.

(25)

A management method by a management device which belongs to a second PLMN, the method including:

receiving a notification regarding registration of a wireless communication device from a first management device belonging to a first PLMN; and transmitting a notification regarding paging to the first management device in a case where a paging request addressed to the wireless communication device is received from the second PLMN.

REFERENCE SIGNS LIST

1 UE
10 MANAGEMENT DEVICE
11 NETWORK COMMUNICATION UNIT
12, 130 STORAGE UNIT
13, 140 CONTROL UNIT
20 NETWORK
30 SIM
100 WIRELESS COMMUNICATION DEVICE
120 COMMUNICATION UNIT
131, 149 STATE MANAGEMENT UNIT
141 SWITCHING CONTROL UNIT
142, 144 ACQUISITION UNIT
143 SELECTION UNIT
145 DETERMINATION UNIT
146 REGISTRATION SELECTION UNIT
147 REGISTRATION PROCESSING UNIT
148 DEREGISTRATION PROCESSING UNIT

The invention claimed is:

1. A wireless communication device comprising:
a control unit that acquires a first PLMN list on a basis of information stored in a first subscriber identity module, selects a home PLMN from the first PLMN list,
acquires a second PLMN ID on a basis of information stored in a second subscriber identity module,
perform a first registration request to a first management device which belongs to the home PLMN and manages registration of the wireless communication device in a case where the second PLMN ID is not included in the first PLMN list, and
performs, to the first management device, a second registration request with information regarding the second PLMN included in the second registration request in a case where the second PLMN ID is included in the first PLMN list.

2. The wireless communication device according to claim 1, wherein
the control unit acquires an EHPLMN list and a forbidden PLMN list from the first subscriber identity module, and
sets a list obtained by removing the forbidden PLMN list from the EHPLMN list as the first PLMN list.

3. The wireless communication device according to claim 2, wherein
the control unit performs a registration deletion request to a second management device which belongs to the second PLMN and manages registration of the wireless communication device, and then performs the first or second registration request to the first management device.

4. The wireless communication device according to claim 3, wherein
the control unit performs the first or second registration request to the first management device in a case where switching from the second management device to the first management device is determined.

5. The wireless communication device according to claim 4, wherein
the control unit performs the first or second registration request to the first management device in a case where a switching instruction to the first management device from the second management device is received.

6. The wireless communication device according to claim 5, wherein
the switching instruction includes a timer period, and the control unit requests the first management device to perform registration during the timer period.

7. The wireless communication device according to claim 6, wherein
in a case of requesting the first management device to perform registration during the timer period, the control unit transmits a registration request signal including a registration period in which the registration is performed.

8. The wireless communication device according to claim 7, wherein
the control unit requests registration in the first management device without requesting deletion of registration in the second management device during the timer period.

9. The wireless communication device according to claim 8, wherein
the control unit manages a registration/non-registration state in the first and second management devices, and in a case where the timer period or the registration period ends, causes a registration state in the first management device to transition to a non-registration state.

10. A communication control method comprising:
acquiring a first PLMN list on a basis of information stored in a first subscriber identity module;
selecting a home PLMN from the first PLMN list;
acquiring a second PLMN ID on a basis of information stored in a second subscriber identity module;
performing a first registration request to a first management device which belongs to the home PLMN and manages mobility in a case where the second PLMN ID is not included in the first PLMN list, and
performing, to the first management device, a second registration request with information regarding the second PLMN included in the second registration request in a case where the second PLMN ID is included in the first PLMN list.

\* \* \* \* \*